US012785891B2

(12) United States Patent
Farmanbar et al.

(10) Patent No.: US 12,785,891 B2
(45) Date of Patent: Nov. 3, 2026

(54) FACILITATING LOW-DENSITY DEMODULATION REFERENCE SIGNAL CONFIGURATIONS IN ADVANCED COMMUNICATION NETWORKS

(71) Applicant: Dell Products, L.P., Round Rock, TX (US)

(72) Inventors: Hamidreza Farmanbar, Ottawa (CA); Gwenael Poitau, Montreal (CA); Evgeny Paltin, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 367 days.

(21) Appl. No.: 18/339,307

(22) Filed: Jun. 22, 2023

(65) Prior Publication Data

US 2024/0430058 A1 Dec. 26, 2024

(51) Int. Cl.
*H04L 5/00* (2006.01)

(52) U.S. Cl.
CPC .......... *H04L 5/0051* (2013.01); *H04L 5/0005* (2013.01)

(58) Field of Classification Search
CPC ..... H04L 5/0048; H04L 5/005; H04L 5/0051; H04L 5/0053; H04L 5/0005; H04L 5/0007; H04L 5/0094; H04W 72/044; H04W 72/0446; H04W 72/0453; H04W 56/0015
See application file for complete search history.

(56) References Cited

U.S. PATENT DOCUMENTS

2013/0121276 A1* 5/2013 Kim ...................... H04W 72/23 370/329
2014/0226636 A1 8/2014 Xu et al.
2014/0301346 A1* 10/2014 Seo ...................... H04L 5/0055 370/329
2023/0030162 A1* 2/2023 Ren ...................... H04W 76/27
2023/0336307 A1 10/2023 Zhang et al.

FOREIGN PATENT DOCUMENTS

WO 2022/077469 A1 4/2022
WO 2023/197147 A1 10/2023

OTHER PUBLICATIONS

Holma et al., "Extreme Massive Mimo for Macro Cell Capacity Boost in 5G Advanced and 6G", Nokia Bell Labs White Paper, 2021. (14 pages).

(Continued)

*Primary Examiner* — Peter Chen
(74) *Attorney, Agent, or Firm* — Amin, Turocy & Watson, LLP

(57) ABSTRACT

Facilitating low-density demodulation reference signal configuration in advanced communication networks is provided herein. A method includes, based on a demodulation reference signal (DM-RS) configuration determined for at least one user equipment and a defined density, expanding, by network equipment comprising a processor, a set of DM-RS ports across consecutive physical resource blocks (PRBs). Expanding the set of DM-RS ports can include dividing the set of DM-RS ports into a first subset of DM-RS ports and at least a second subset of DM-RS ports. Further, expanding the set of DM-RS ports can include assigning the first subset of DM-RS ports and at least the second subset of DM-RS ports to respective PRBs of the consecutive PRBs.

20 Claims, 18 Drawing Sheets

(56) References Cited

OTHER PUBLICATIONS

International Search Report and Written Opinion received for PCT Application Serial No. PCT/US2023/036198 dated Mar. 22, 2024, 15 pages.
International Preliminary Report on Patentability received for PCT Application Serial No. PCT/US2023/036198 dated Jan. 2, 2026, 9 pages.
Communication pursuant to Rules 161(1) and 162 EPC received for EP Application Serial No. 23817867.7 dated Jan. 29, 2026, 3 pages.

* cited by examiner

FACILITATING LOW-DENSITY DEMODULATION REFERENCE SIGNAL CONFIGURATIONS IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), the amount of data to be transmitted (e.g., wireless data rate requirement) is higher as compared to Long Term Evolution (LTE) networks, for example. Such increase in the transmitted amount of data can be attributed to the exponential increase in the network traffic flowing through the advanced network and the need for faster processing of complex tasks. Accordingly, unique challenges exist related to network efficiency and in view of forthcoming Fifth Generation (5G), New Radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method is provided that includes, based on a demodulation reference signal (DM-RS) configuration determined for at least one user equipment and a defined density, expanding, by network equipment comprising a processor, a set of DM-RS ports across consecutive physical resource blocks (PRBs). Expanding the set of DM-RS ports can include dividing the set of DM-RS ports into a first subset of DM-RS ports and at least a second subset of DM-RS ports. Further, expanding the set of DM-RS ports can include assigning the first subset of DM-RS ports and at least the second subset of DM-RS ports to respective PRBs of the consecutive PRBs. The network equipment can be configured to operate according to a new radio network communication protocol.

In an example, the consecutive PRBs can be consecutive in a frequency dimension. Further, expanding the set of DM-RS ports can include distributing the first subset of DM-RS ports and the second subset of DM-RS ports across the consecutive PRBs in the frequency dimension.

In another example, the consecutive PRBs can be consecutive in a time dimension. Further to this example, expanding the set of DM-RS ports can include distributing the first subset of DM-RS ports and the second subset of DM-RS ports across the consecutive PRBs in the time dimension.

According to another example, the consecutive PRBs comprise a first PRB, a second PRB, a third PRB, and at least a fourth PRB. A first group comprising the first PRB and the second PRB and a second group comprising the third PRB and the fourth PRB can be consecutive in a frequency dimension. A third group comprising the first PRB and the third PRB and a fourth group comprising the second PRB and the fourth PRB can be consecutive in a time dimension. Further to this example, expanding the set of DM-RS ports can include distributing the first subset of DM-RS ports and the second subset of DM-RS ports across the consecutive PRBs in the frequency dimension and the time dimension.

In an implementation, expanding the set of DM-RS ports can include distributing the first subset of DM-RS ports and the second subset of DM-RS ports across the consecutive PRBs in a disjoint arrangement. According to an additional or alternative implementation, expanding the set of DM-RS ports can include distributing the first subset of DM-RS ports and the second subset of DM-RS ports across the consecutive PRBs in a non-disjoint arrangement.

According to an implementation, the method can include using, by the network equipment, three consecutive Orthogonal Frequency-Division Multiplexing (OFDM) symbols in respective PRBs of the consecutive PRBs. In some implementations, the method can include using, by the network equipment, four consecutive OFDM symbols in respective PRBs of the consecutive PRBs.

Another embodiment relates to a system that includes a processor and a memory that stores executable instructions that, when executed by the processor, facilitate performance of operations. The operations can include, based on a defined demodulation reference signal (DM-RS) configuration for at least one user equipment, dividing a group of pilot symbols into respective subsets of pilot symbols. The operations can also include assigning the respective subsets of pilot symbols to respective physical resource blocks (PRBs) of a set of consecutive PRBs. Further, the operations can include transmitting, to the at least one user equipment, the set of consecutive PRBs that comprise pilot symbols and data symbols. In an example, the set of consecutive PRBs are consecutive in a time dimension, a frequency dimension, or a combination thereof. The system can be configured to operate within a communication network that employs extreme multiple input multiple output technology.

According to an implementation, assigning the respective subsets of pilot symbols can include distributing the pilot symbols among the consecutive PRBs in a disjoint arrangement of pilot symbols. In an additional or alternative implementation, assigning the respective subsets of pilot symbols can include distributing the pilot symbols among the consecutive PRBs in a non-disjoint arrangement of pilot symbols.

Prior to the assigning and based on the dividing, the operations can include, according to some implementations, determining that a measured density of pilot symbols, after the dividing, fails to satisfy a defined density level. Therefore, the operations can include using a tri-symbol configuration for the respective subsets of pilot symbols within the respective PRBs.

In another implementation, prior to the assigning and based on the dividing, the operations can include determining that a measured density of pilot symbols, after the dividing, fails to satisfy a defined density level. Thus, the operations can also include using a quad-symbol configuration for the respective subsets of pilot symbols within the respective PRBs.

According to another embodiment, provided herein is a non-transitory machine-readable medium, comprising executable instructions that, when executed by a processor of network equipment, facilitate performance of operations. The operations can include, based on a demodulation reference signal (DM-RS) configuration determined for at least one user equipment, assigning a first group of demodulation reference signals (DM-RS) to respective first resource elements of a first physical resource block (PRB). Further, the operations can include assigning a second group of DM-RS to respective second resource elements of a second PRB. The first PRB and at least the second PRB are contiguous physical resource blocks.

In an example, the first PRB and at least the second PRB are contiguous physical resource blocks in a time dimension, a frequency dimension, or both the time dimension and the frequency dimension. According to some implementations, assigning the first group of DM-RS and assigning the second group of DM-RS can include using one of a tri-symbol DM-RS configuration or a quad-symbol DM-RS configuration.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

In order to address the ever-increasing wireless data rate requirements in the evolution of 5G into 6G and beyond, extreme Multiple Input Multiple Output (MIMO) technology is under investigation by big industry players and researchers across the globe. Extreme MIMO is expected to provide significant capacity increase using future mid-band spectrum 6-20 GHz with antenna arrays at network equipment (e.g., base stations) with up to 1024 elements and larger antenna arrays at the terminals. Furthermore, extreme MIMO is expected to support up to 64-layer downlink transmission at mid-band spectrum. Major steps in technology evolution are necessary to make extreme MIMO technology a reality. It is noted that although reference is made to "extreme" MIMO, other names can be utilized to refer to such technology.

A problem addressed with the disclosed embodiments is the channel estimation problem in extreme MIMO implementations. Due to the large number of downlink transmission layers (e.g., up to 64), a large portion of transmission resources would be occupied by pilots. The pilots are reference symbols known by the receiver, e.g., a user equipment (UE), that are to be transmitted for every layer for channel estimation. Such large pilot overhead limits the capability of increasing data transmission rates envisioned for extreme MIMO.

In 3GPP terminology, the pilot symbols designed for the purpose of symbol demodulation at the receiver (e.g., UE) are referred to as Demodulation Reference Signals (DM-RS). In OFDM, DM-RS are assigned to resource elements (REs) within a physical resource block (PRB) according to specific patterns specified in 5G NR standards.

Figure 1:
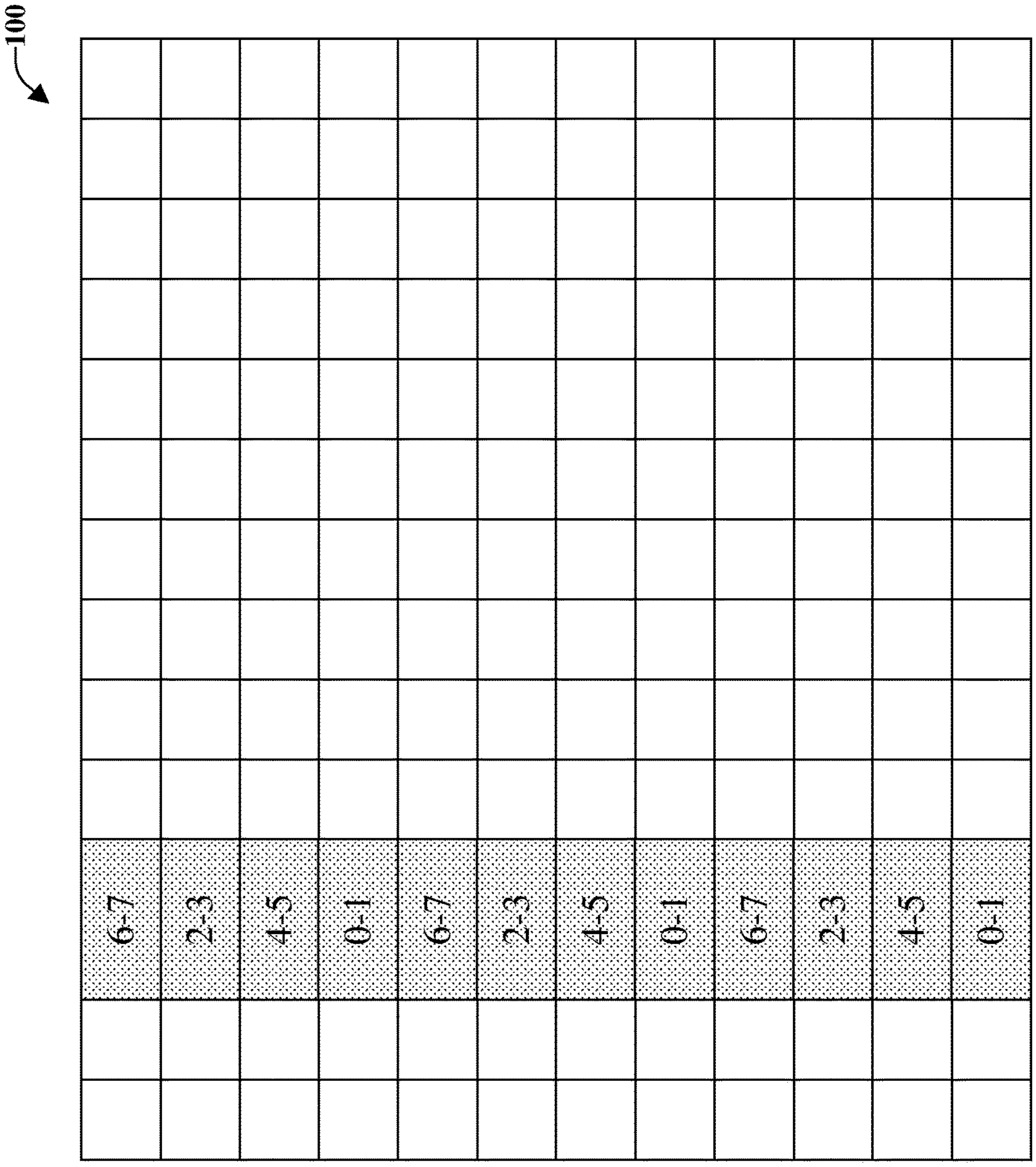
FIG. 1 illustrates an example, non-limiting, schematic representation of a physical resource block.

5G NR supports up to 8 DM-RS ports for downlink single user MIMO (SU-MIMO) transmission. FIG. 1 illustrates an example, non-limiting, schematic representation of a physical resource block (PRB 100). The PRB 100 is represented as a grid of 12 subcarriers (vertical axis) by 14 OFDM symbols (horizontal axis). For purposes of simplicity, only a single PRB is illustrated in FIG. 1. However, in implementation, there can be many PRBs stacked horizontally and/or vertically, which produces a very large grid.

The PRB 100 includes a DM-RS pattern for 8 DM-RS ports (labeled 0 through 7). In this example, the pilots are transmitted on the third and fourth OFDM symbols. Data can be transmitted on the other OFDM symbols, namely, the first, second, and fifth through fourteenth OFDM symbols. According to various implementations, the DM-RS ports can be transmitted on different OFDM symbols than the ones shown and described.

As indicated, the DM-RS ports are repeated three times in the PRB 100. The repetition increases the density for better channel estimation by the receiver (e.g., the UE). If the density is reduced, the quality of the channel estimation is reduced. A benefit of reducing the density is that there can be more OFDM symbols on which data can be sent, instead of being occupied by the pilot symbols. Thus, there is a trade-off between better channel estimation (higher density) and the opportunity to transmit more data (lower density).

The DM-RS pattern of FIG. 1 can be referred to as a Type 1 double-symbol DM-RS (e.g., 8 antenna ports). As illustrated, two OFDM symbols (third and fourth OFDM symbols) out of 14 total in the PRB 100 are occupied by DM-RS resulting in approximately fourteen percent of time and/or frequency resources (e.g., 2 divided by 14 is around 14% or (2/14≅14%). Such overhead increases to around twenty-eight percent (e.g., ~28%) for two DM-RS instances per slot.

The 8-port DM-RS pattern of FIG. 1 repeats three times in one PRB (e.g., the PRB 100). As discussed herein, the DM-RS density is defined as the number of times a full set of DM-RS ports (numbered 0-7) is repeated in one PRB. Accordingly, the DM-RS density for the configuration in FIG. 1 is 3 because the DM-RS ports are repeated three times.

Figure 2:
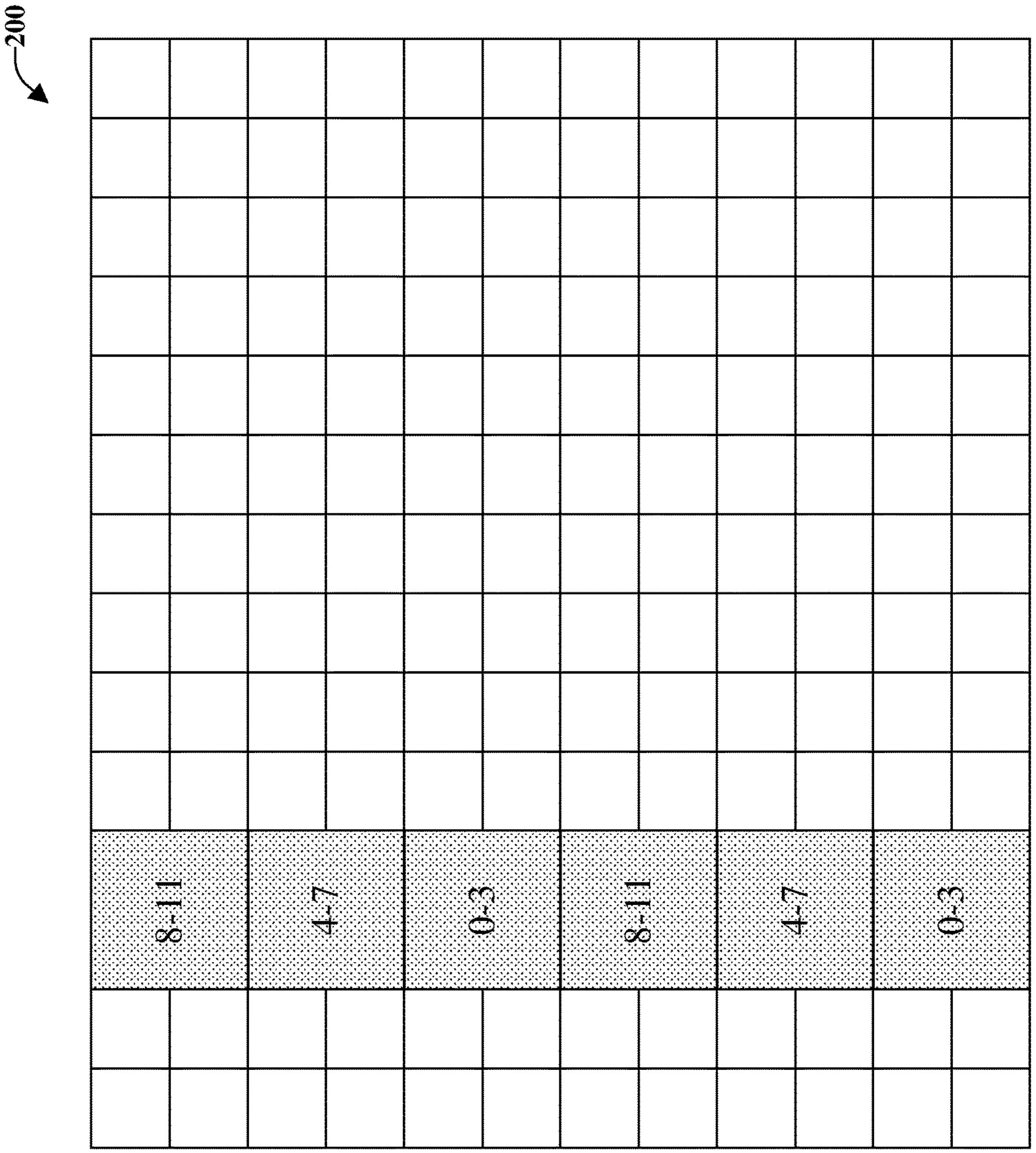
FIG. 2 illustrates another example, non-limiting, schematic representation of a physical resource block.

FIG. 2 illustrates another example, non-limiting, schematic representation of a physical resource block (PRB 200). The PRB 200 is represented as a grid of 12 subcarriers (vertical axis) by 14 OFDM symbols (horizontal axis). For purposes of simplicity, only a single PRB is illustrated in FIG. 2. However, in implementation, there can be many PRBs stacked horizontally and/or vertically, which produces a very large grid.

The PRB 200 includes a DM-RS pattern for 12 DM-RS ports (labeled 0 through 11). In this example, the pilots are transmitted on the third and fourth OFDM symbols. Data can be transmitted on the other OFDM symbols, namely, the first, second, and fifth through fourteenth OFDM symbols. According to various implementations, the DM-RS ports can be transmitted on different OFDM symbols than the ones shown and described.

As indicated, the DM-RS ports are repeated twice in the PRB 200. FIG. 2 illustrates a second type (Type 2) double-symbol DM-RS (12 antenna ports and 24 DM-RS are transmitted). For MU-MIMO, 5G NR supports up to 12 DM-RS ports (numbered 0-11) as depicted in FIG. 2. However, the DM-RS overhead is the same as in the SU-MIMO case (FIG. 1). The reason that the DM-RS overhead is not more than the SU-MIMO case is that the DM-RS density is 2 (FIG. 2) rather than 3 (FIG. 1).

Currently, 8 and 12 are the maximum number of DM-RS ports supported by NR. A challenge being addressed with the disclosed embodiments is the large DM-RS overhead for a larger number of antenna ports than those already supported in current 5G NR. A straightforward extension (or continuation of the approaches discussed in FIG. 1 and FIG. 2) to 16 or 32 DM-RS ports for extreme MIMO would result in prohibitively large DM-RS overhead.

For example, using the same approach as discussed above for 16 DM-RS ports would result in 4 OFDM symbols out of 14 total OFDM symbols in a PRB being occupied by DM-RS. This would result in approximately 28 percent of time and/or frequency resources being occupied (e.g., 4 divided by 14 is about 28% or 4/14≅28%).

For 32 DM-RS ports, 8 OFDM symbols out of 14 total OFDM symbols in a PRB would be occupied by DM-RS. This results in about 57% of the time and/or frequency resources being occupied (e.g., 8 divided by 14 is about 57% or 8/14≅57%), which is not viable. For 32 DM-RS ports, the case of two DM-RS instances would not be even possible (e.g., results in over 100% occupation). Accordingly, the disclosed embodiments provide for a DM-RS configuration that does not include such a large amount of overhead as discussed above for the 16 and 32 DM-RS port cases.

Figure 3:
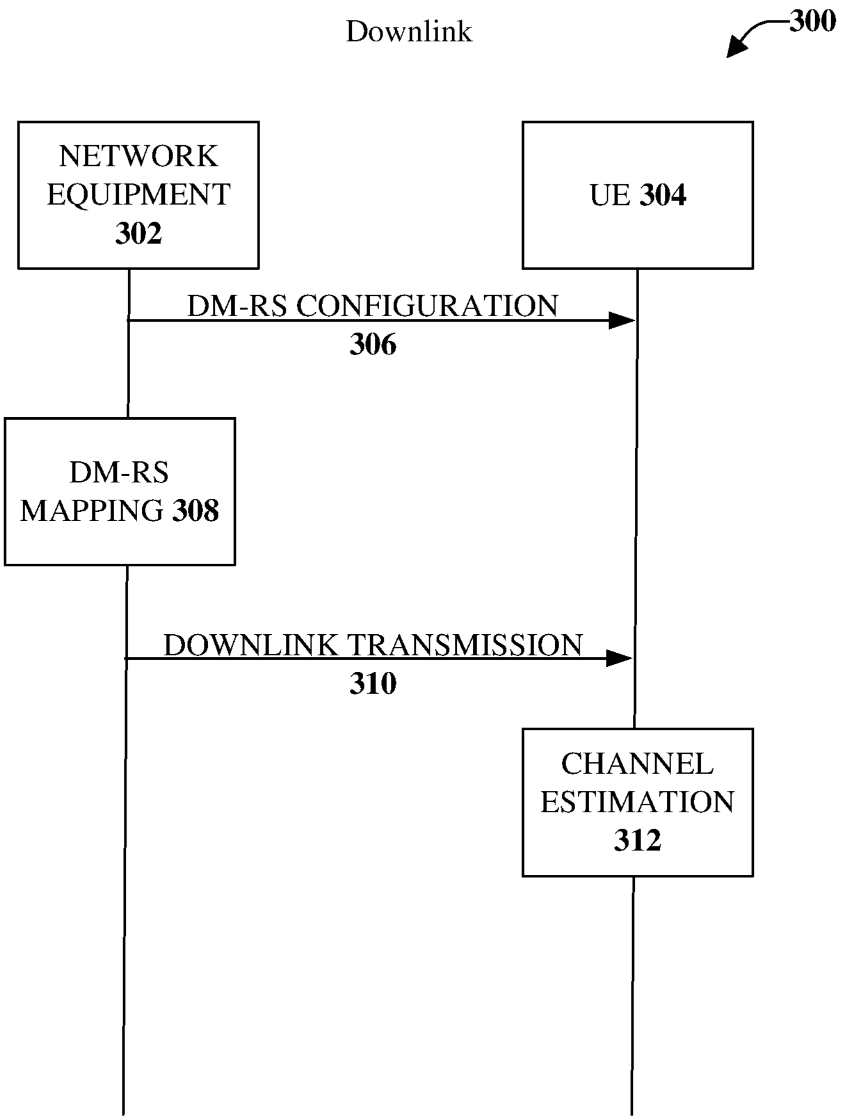
FIG. 3 illustrates an example, non-limiting, message sequence flow chart that facilitates downlink demodulation reference signal (DM-RS) configuration and transmission in accordance with one or more embodiments described herein.

FIG. 3 illustrates an example, non-limiting, message sequence flow chart 300 that facilitates downlink DM-RS configuration and transmission in accordance with one or more embodiments described herein. Illustrated are network equipment 302 and user equipment (UE 304). The network equipment can be, or can include, a gNB, for example.

The disclosed embodiments are related to a DM-RS design for a large number of antenna ports that are not supported in the existing 5G NR. FIG. 3 depicts the general flow diagram for DM-RS configuration for downlink transmission.

As illustrated, the network equipment 302 transmits, to the UE 304, a DM-RS configuration 306. The UE 304 is able to use the DM-RS configuration because, in order to estimate the channel, the UE is able to know, as a result, what position in the PRB the DM-RS is transmitted, which is achieved by the DM-RS configuration 306.

There is a corresponding DM-RS mapping 308 by the network equipment 302. The mapping indicates which symbols in the grid (e.g., the PRB) contain the DM-RS. Upon or after the DM-RS mapping 308, a downlink transmission 310 is sent to the UE 304, which is where the pilot transmission and data transmission occur. Upon or after receipt of the downlink transmission, the UE 304 performs channel estimation 312. Thereafter, decoding is performed by the UE 304.

In 5G NR DM-RS configurations, a full set of DM-RS ports is allocated within a PRB with pre-defined multiplicities and/or densities. For example, in FIG. 1, three sets of 8 DM-RS ports (numbered 0-7) are allocated in one PRB. Further, in FIG. 2, two sets of 12 DM-RS ports (numbered 0-11) are allocated in one PRB. In order to support a large number of DM-RS antenna ports, the disclosed embodiments reduce DM-RS density in a PRB.

As discussed herein, the number of DM-RS ports beyond what is currently supported in NR can be achieved by reducing DM-RS density within a PRB. The maximum number of DM-RS ports using double-symbol DM-RS will then be 24 by reducing the DM-RS density to 1 in either Type 1 or Type 2 configurations shown in FIG. 1 and FIG. 2, respectively. In order to support the demands of extreme MIMO, alternative DM-RS configurations are provided herein to support 32 DM-RS ports, 64 DM-RS ports, or another number of DM-RS ports.

Figure 4:
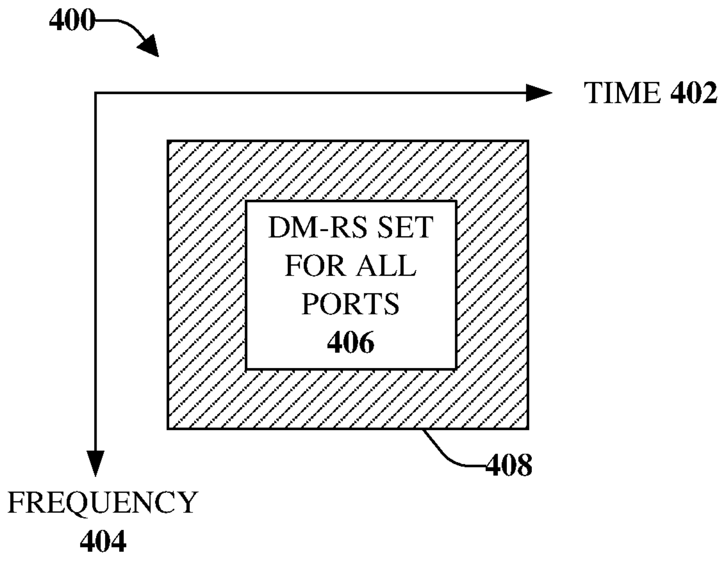
FIG. 4 illustrates a schematic representation of a DM-RS configuration that utilizes a single PRB.

As provided herein, a large number of antenna ports (e.g., 32 or 64 antenna ports) are supported by reducing DM-RS density across time and/or frequency such that one full set of DM-RS ports is expanded across multiple consecutive PRBs. The concept of DM-RS expansion over multiple consecutive PRBs as provided herein is depicted in FIGS. 4-7. FIG. 4 illustrates a schematic representation of a DM-RS configuration 400 that utilizes a single PRB. Time 402 is illustrated on the horizontal axis and frequency 404 is illustrated on the vertical axis. The DM-RS configuration 400 is for 5G NR where the DM-RS for all transmission layers 406 (antenna ports) is within one single PRB 408. The same or a similar pattern can repeat for other PRBs. Having the DM-RS for all transmission layers in a single PRB is possible for a low number of DM-RS ports (e.g., 8 or 12 as discussed with respect to FIG. 1 and FIG. 2, respectively). However, as previously discussed, this type of configuration is not applicable to larger numbers of DM-RS ports.

Figure 5:
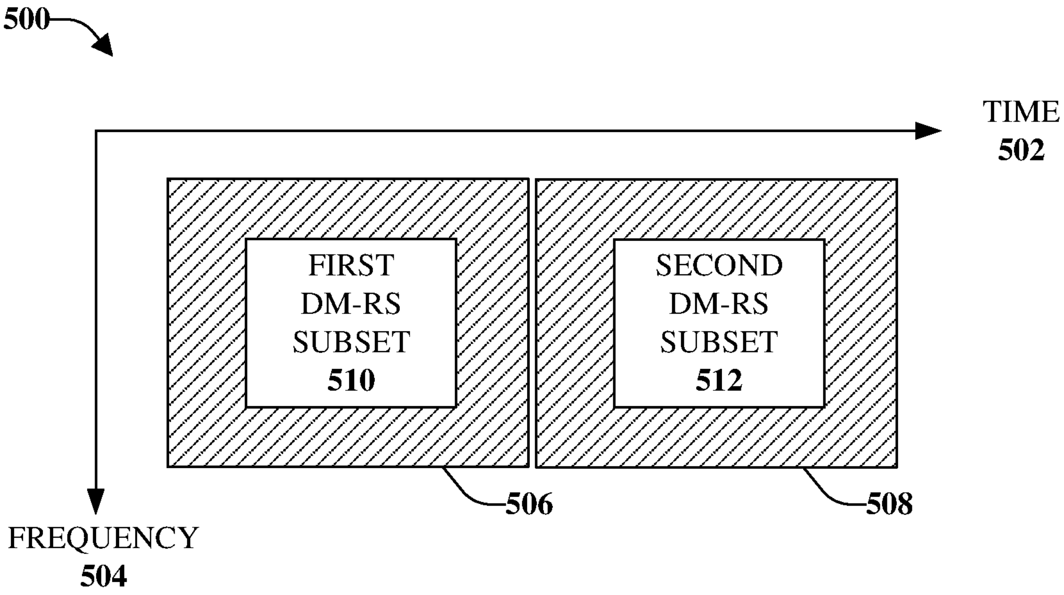
FIG. 5 illustrates an example, non-limiting, schematic representation of a DM-RS configuration for DM-RS expansion across a time dimension in accordance with one or more embodiments described herein.

FIG. 5 illustrates an example, non-limiting, schematic representation of a DM-RS configuration 500 for DM-RS expansion across a time dimension in accordance with one or more embodiments described herein. Time 502 is illustrated on the horizontal axis and frequency 504 is illustrated on the vertical axis. The DM-RS configuration 500 includes two PRBs, illustrated as a first PRB 506 and a second PRB 508. The first PRB 506 and the second PRB 508 are consecutive PRBs in the time dimension.

A first set of DM-RS ports 510 is included in the first PRB 506 and a second set of DM-RS ports 512 is included in the second PRB 508. In the case of 32 antenna ports, 16 antenna ports can be included in the first set of DM-RS ports 510 and the other 16 antenna ports can be included in the second set of DM-RS ports 512, for example. However, other configurations for the expansion can be utilized with the disclosed embodiments.

In some implementations, the DM-RS sets can be disjoint or in a disjoint arrangement (e.g., the DM-RS sets appear in only one PRB). However, in other implementations, the DM-RS sets can be non-disjoint or in a non-disjoint arrangement (e.g., the DM-RS sets appear in multiple PRBs). Details related to the disjoint and non-disjoint embodiments will be discussed below with respect to FIG. 10 and FIG. 11. It is noted that the DM-RS can be divided or expanded into more than two subsets across more than two PRBs. However, only two subsets and two PRBs are illustrated and described for purposes of simplicity. Although the DM-RS configuration 500 has reduced the density in the time dimension, the density is not reduced in the frequency dimension.

Figure 6:
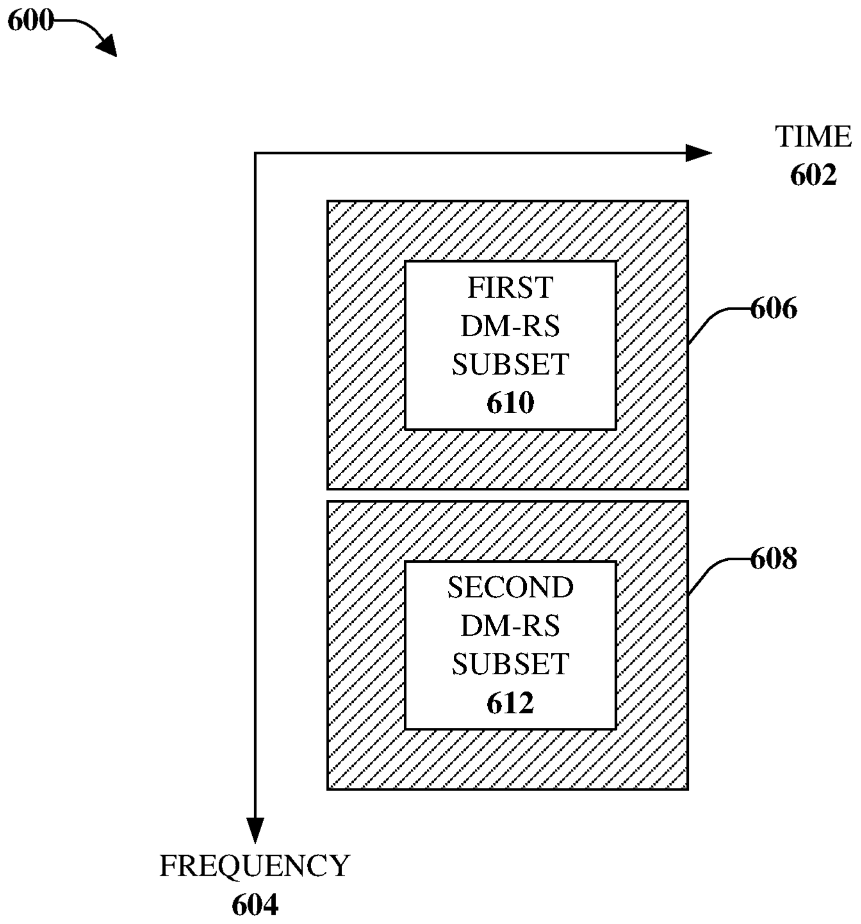
FIG. 6 illustrates an example, non-limiting, schematic representation of a DM-RS configuration for DM-RS expansion across a frequency dimension in accordance with one or more embodiments described herein.

FIG. 6 illustrates an example, non-limiting, schematic representation of a DM-RS configuration 600 for DM-RS expansion across a frequency dimension in accordance with one or more embodiments described herein. Time 602 is illustrated on the horizontal axis and frequency 604 is illustrated on the vertical axis. The DM-RS configuration 600 includes two PRBs, illustrated as a first PRB 606 and a second PRB 608 in the frequency dimension.

A first set of DM-RS ports 610 is included in the first PRB 606 and a second set of DM-RS ports 612 is included in the second PRB 608. The first PRB 606 and the second PRB 608 are consecutive PRBs in the frequency dimension. It is noted that the DM-RS can be divided or expanded into more than two subsets across more than two PRBs. However, only two subsets and two PRBs are illustrated and described for purposes of simplicity. Although the DM-RS configuration 600 has reduced the density in the frequency dimension, the density has not been reduced in the time dimension.

A first set of DM-RS ports 610 is included in the first PRB 606 and a second set of DM-RS ports 612 is included in the second PRB 608. In the case of 32 antenna ports, 16 can be included in the first set of DM-RS ports 610 and the other 16 can be included in the second set of DM-RS ports 612, for example. In some implementations, the DM-RS sets can be disjoint (e.g., appear in only one PRB). However, in other implementations, the DM-RS sets can be non-disjoint (e.g., appear in multiple PRBs). It is noted that the DM-RS can be divided or expanded into more than two subsets across more than two PRBs. However, only two subsets and two PRBs are illustrated and described for purposes of simplicity. Although in the DM-RS configuration 600 has reduced the density in the frequency dimension, the density is not reduced in the time dimension.

Figure 7:
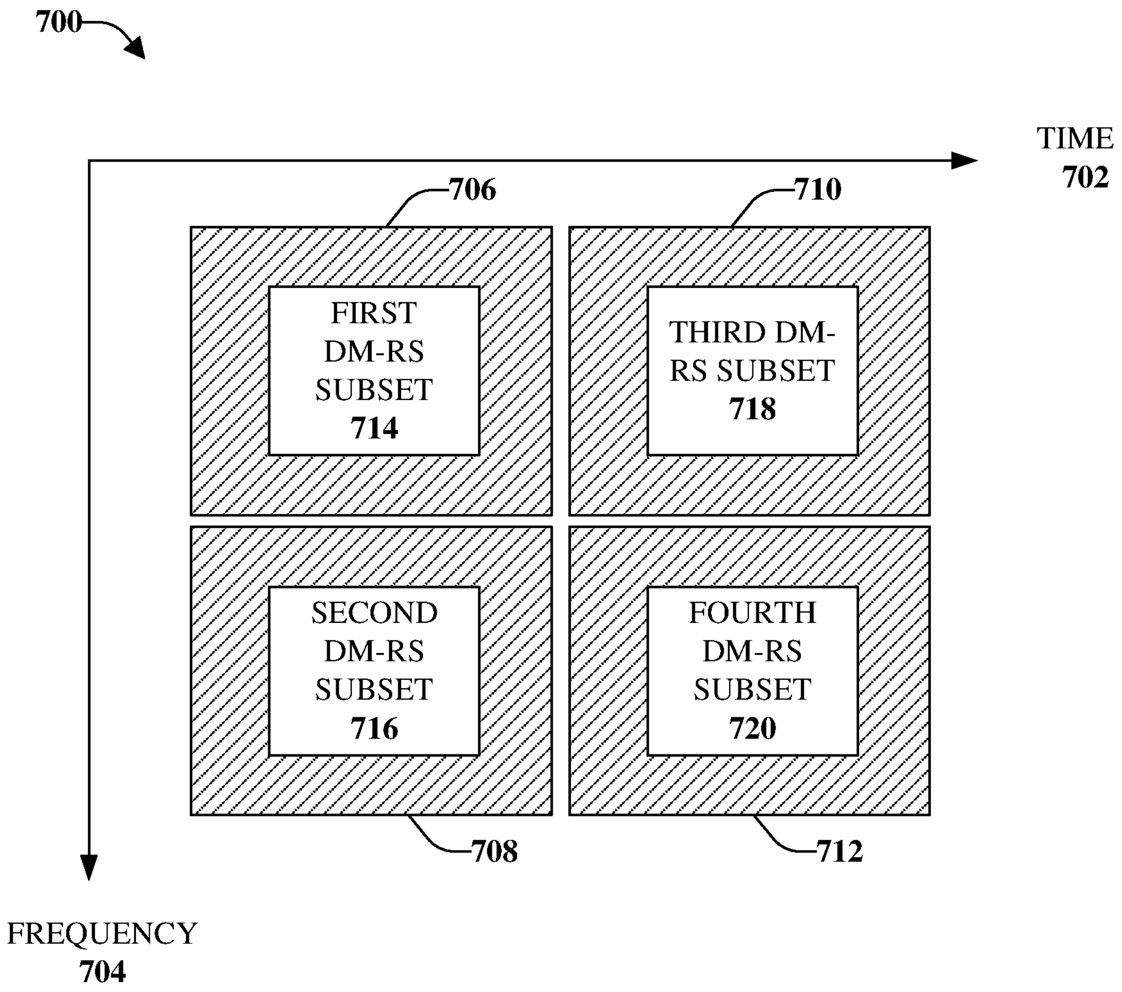
FIG. 7 illustrates an example, non-limiting, schematic representation of a demodulation reference signal configuration for DM-RS expansion across both a time dimension and a frequency dimension in accordance with one or more embodiments described herein.

FIG. 7 illustrates an example, non-limiting, schematic representation of a DM-RS configuration 700 for DM-RS expansion across both a time dimension and a frequency dimension in accordance with one or more embodiments described herein. Time 702 is illustrated on the horizontal axis and frequency 704 is illustrated on the vertical axis.

The DM-RS configuration 700 of FIG. 7 includes four PRBs, illustrated as a first PRB 706, a second PRB 708, a third PRB 710, and a fourth PRB 712. The first PRB 706 and the second PRB 708 (e.g., a first group) are consecutive PRBs in the frequency dimension. In a similar manner, the third PRB 710 and the fourth PRB 712 (e.g., a second group) are consecutive PRBs in the frequency dimension. Further, the first PRB 706 and the third PRB 710 (e.g., a third group) are consecutive PRBs in the time dimension. In a similar manner, the second PRB 708 and the fourth PRB 712 (e.g., a fourth group) are consecutive PRBs in the time dimension. It is noted that although discussed with respect to four PRBs, another number of PRBs can be utilized with the disclosed embodiments. Further, an equal or unequal number of PRBs can be associated with the time and frequency domains. For example, a first number of PRBs across the time domain and a second number of PRBs across the frequency domain can be a same number or different numbers.

In the example of FIG. 7, the DM-RS ports are divided into four subsets. A first set of DM-RS ports 714 is included in the first PRB 706. A second set of DM-RS ports 716 is included in the second PRB 708. A third set of DM-RS ports 718 is included in the third PRB 710. The fourth set of DM-RS ports 720 is included in the fourth PRB 712. Accordingly, density is being reduced in both the time dimension and the frequency dimension. In some implementations, the DM-RS sets can be disjoint (e.g., appear in only one PRB). However, in other implementations, the DM-RS sets can be non-disjoint (e.g., appear in multiple PRBs). The DM-RS subsets in consecutive PRBs are not restricted to being in a disjoint arrangement. This provides flexibility for a more distributed DM-RS pattern, which can provide a better interpolation in channel estimation. Additional details related to disjoint and/or non-disjoint DM-RS sets will be discussed below with respect to some use case examples. Further, although discussed with respect to four sets of DM-RS ports. The disclosed embodiments are not limited to this number and any number of sets of DM-RS ports can be utilized.

For the proposed expanded DM-RS designs of FIGS. 5-7, each DM-RS subset can follow the same or similar pattern as in 5G NR. For example, 32-port DM-RS can be configured using the embodiment shown in FIG. 7 where each of 4 DM-RS subset of size 8 follows the same design of 5G NR 8-port DM-RS. However, in other embodiments another pattern can be utilized.

The DM-RS configurations depicted in FIGS. 5-7 can support a large number of DM-RS antenna ports by reducing DM-RS density in the time dimension and/or frequency dimension. Reducing the DM-RS density across subcarriers (frequency) can be justified given that the channel is expected to be sparser at future mid-band spectrum (e.g., 6-20 GHZ) compared to low frequency bands resulting in more channel correlation across subcarriers. This alleviates the need for dense DM-RS along the frequency domain. On the other hand, reducing DM-RS density across the time domain can be justified for stationary UEs where channel variations with time are negligible.

For a larger number of antenna ports, DM-RS expansion across multiple PRBs could result in excessively low DM-RS density (e.g., a density that fails to satisfy a defined density threshold). To address this, as well as other issues, in an implementation, tri-symbol DM-RS can be utilized. According to another implementation, quad-symbol DM-RS can be utilized. The tri-symbol DM-RS and quad-symbol DM-RS use cases will be described below with respect to FIG. 8 and FIG. 9, respectively.

Figure 8:
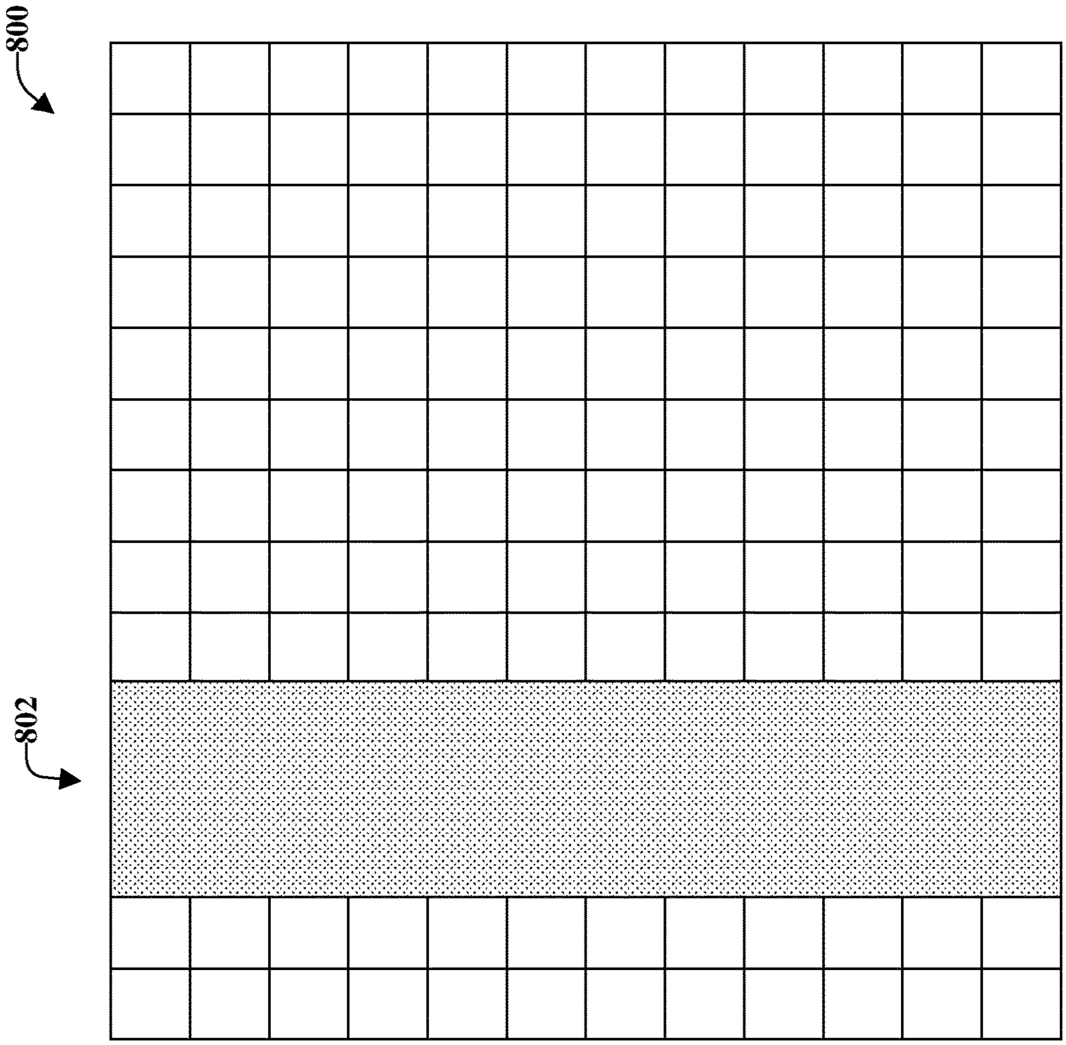
FIG. 8 illustrates an example, non-limiting, schematic representation of a physical resource block for a tri-symbol DM-RS configuration in accordance with one or more embodiments described herein.

FIG. 8 illustrates an example, non-limiting, schematic representation of a physical resource block (PRB 800) for a tri-symbol DM-RS configuration in accordance with one or more embodiments described herein. The PRB 800 is represented as a grid of 12 subcarriers (vertical axis) by 14 OFDM symbols (horizontal axis) For purposes of simplicity only a single PRB is illustrated in FIG. 8. However, in implementation, there can be many PRBs stacked horizontally and/or vertically, which produces a very large grid. As illustrated at 802, the pilots are transmitted on the third, fourth, and fifth OFDM symbols for the tri-symbol DM-RS configuration. Accordingly, DM-RS consumes three consecutive OFDM symbols in the PRB 800, resulting in a higher density. Data can be transmitted on the remaining OFDM symbols (e.g., the first, second, and sixth through fourteen symbols).

Figure 9:
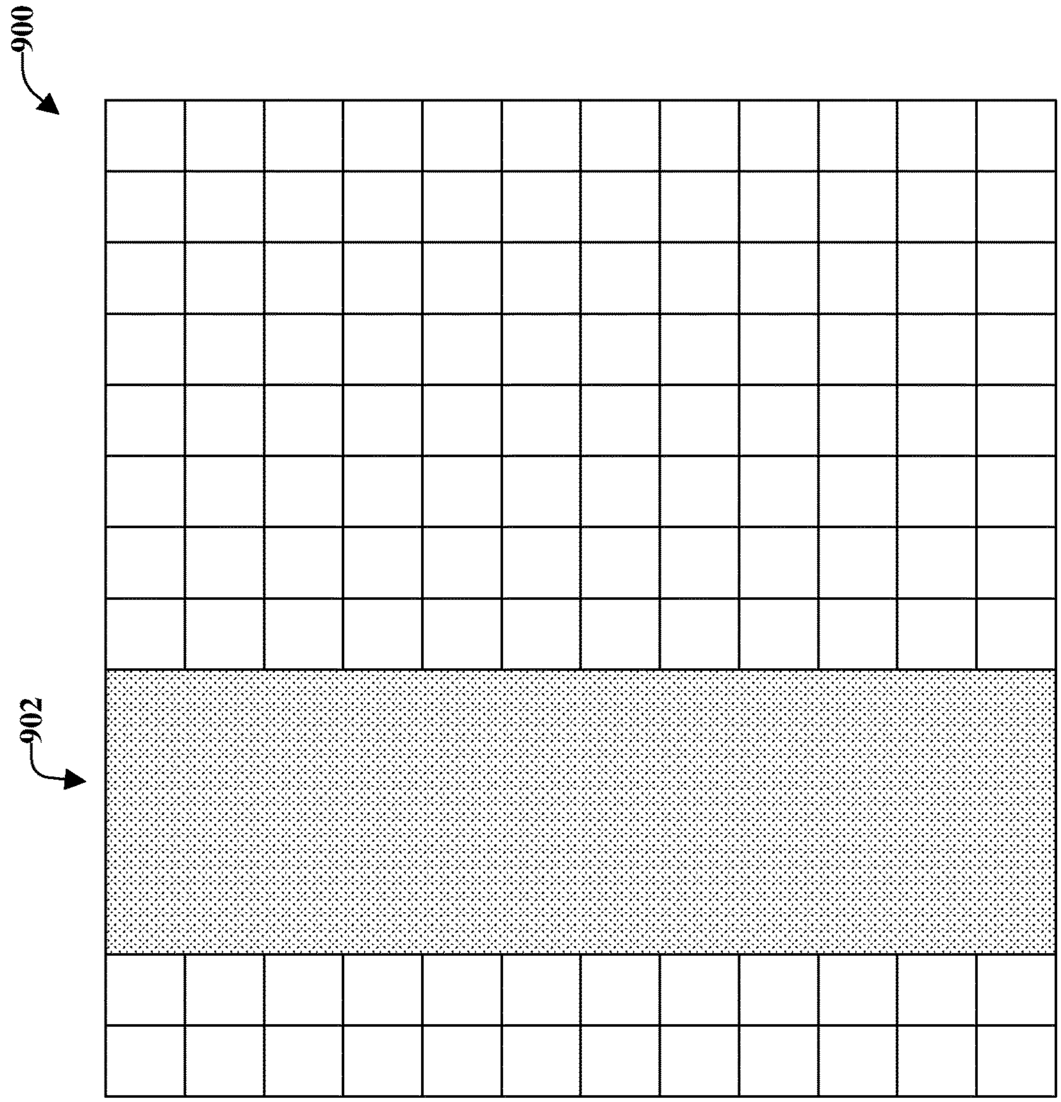
FIG. 9 illustrates an example, non-limiting, schematic representation of a physical resource block for a quad-symbol DM-RS configuration in accordance with one or more embodiments described herein.

FIG. 9 illustrates an example, non-limiting, schematic representation of a physical resource block (PRB 900) for a quad-symbol DM-RS configuration in accordance with one or more embodiments described herein. The PRB 800 is represented as a grid of 12 subcarriers (vertical axis) by 14 OFDM symbols (horizontal axis). For purposes of simplicity only a single PRB is illustrated in FIG. 9. However, in implementation, there can be many PRBs stacked horizontally and/or vertically, which produces a very large grid. As illustrated at 902, the pilots are transmitted on the third, fourth, fifth, and sixth OFDM symbols for the quad-symbol DM-RS configuration. Accordingly, DM-RS consumes four consecutive OFDM symbols in the PRB 900, resulting in a higher density. Data can be transmitted on the remaining OFDM symbols (e.g., the first, second, and seventh through fourteen symbols).

The tri-symbol DM-RS configuration (FIG. 8) and the quad-symbol DM-RS configuration (FIG. 9) can allow for larger DM-RS densities when used along with DM-RS expansion. In the tri-symbol DM-RS configuration and/or the quad-symbol DM-RS configuration, DM-RS consumes three and/or four consecutive OFDM symbols in a PRB, respectively, resulting in higher density.

A relevant aspect of the disclosed embodiments is how the network (e.g., network equipment) chooses a proper DM-RS configuration among embodiments shown in FIGS. 5-7. This decision depends on the number of DM-RS antenna ports, the UE channel state information (CSI), and/or other UE-related information (e.g., UE position, UE speed, etc.) available at the network equipment (e.g., gNB). Such information can be obtained through sensing or another approach. CSI is available at the network equipment either through UE feedback or uplink-downlink channel reciprocity in Time Division Multiplexing (TDD) mode. The network equipment can use collected UE CSI samples in order to analyze UE channel rank and/or sparsity, which can be used for the determination of DM-RS density across the frequency domain. On the other hand, the network equipment can use UE speed as a factor to determine DM-RS density across the time domain. The higher the UE speed and/or UE doppler spread, the more DM-RS are used for sufficient channel estimation accuracy. Use of artificial intelligence (AI) and/or machine learning (ML) processes on current and/or historical network data can also be utilized for the determination of appropriate DM-RS densities for antenna ports.

According to various embodiments, unlike NR, DM-RS corresponding to a full set of antenna ports can be expanded across multiple PRBs. The expansion can be either across two or more consecutive PRBs in the frequency domain, across two or more consecutive PRBs across the time domain, or a combination of two or more consecutive PRBs across the frequency domain and two or more consecutive PRBs across the time domain.

According to some embodiments, the tri-symbol DM-RS configuration and/or the quad-symbol DM-RS configuration can be utilized. Conventionally, 5G NR only supports single-symbol and double-symbol DM-RS. Tri-symbol DM-RS and quad-symbol DM-RS provide the flexibility to increase DM-RS density in case the DM-RS expansion across multiple PRBs results in excessively low DM-RS density.

Figure 10:
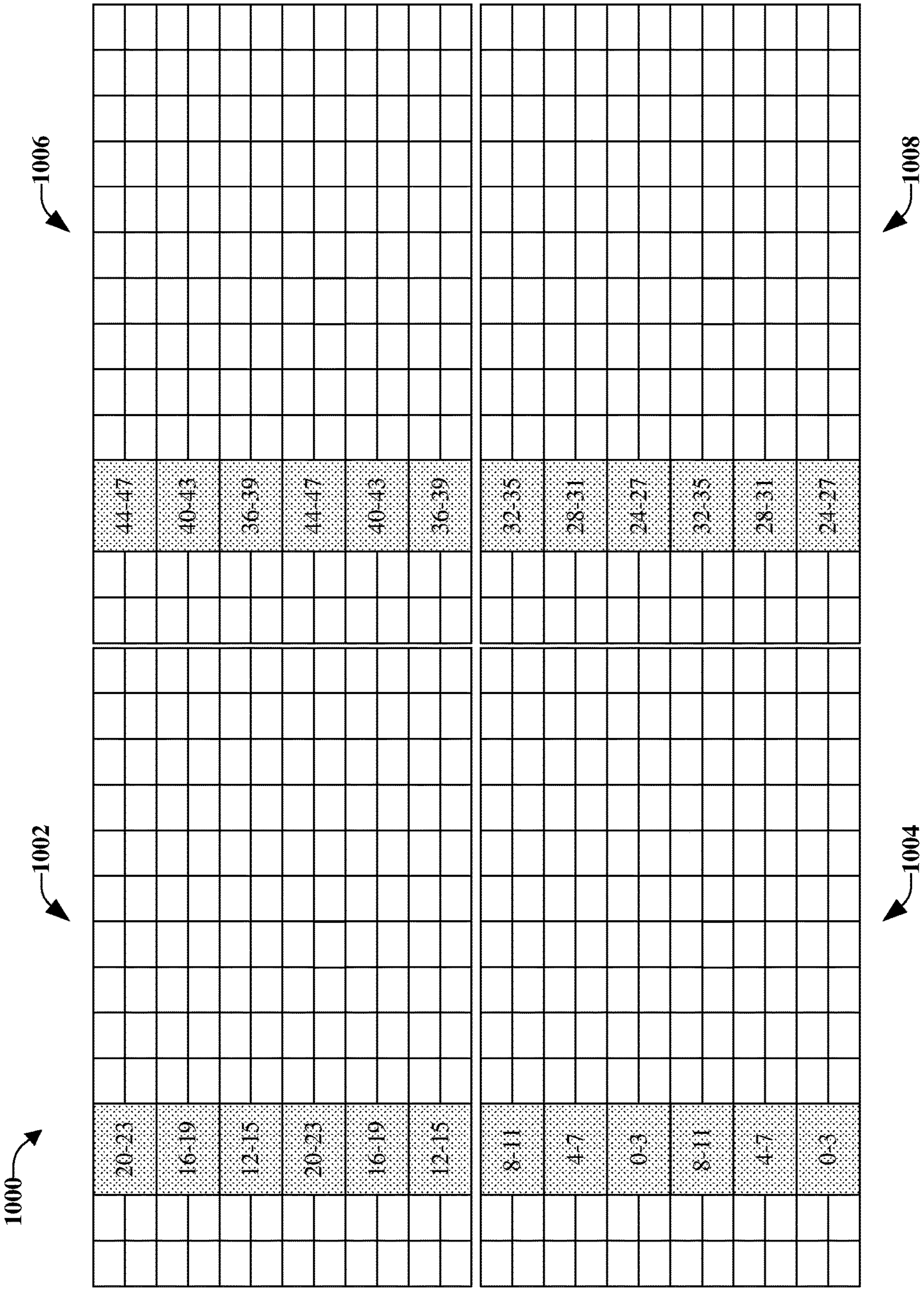
FIG. 10 illustrates an example, non-limiting, schematic representation of a DM-RS configuration with disjoint DM-RS subsets in accordance with one or more embodiments described herein.

FIG. 10 illustrates an example, non-limiting, schematic representation of a DM-RS configuration 1000 with disjoint DM-RS subsets in accordance with one or more embodiments described herein. As illustrated, there are four PRBs, namely, a first PRB 1002, a second PRB 1004, a third PRB 1006, and a fourth PRB 1008. This example considers the NR 12-port DM-RS depicted in FIG. 2 and expands it across 4 PRBs in both time and frequency dimensions.

The example of FIG. 10 includes 48 antenna ports (labeled 0-47) through DM-RS expansion across multiple PRBs suitable for MU-MIMO. The DM-RS expansion is over both the time dimension and the frequency dimension. As depicted, antenna ports 0-11 are within the second PRB 1004; antenna ports 12-23 are within the first PRB 1002; antenna ports 24-35 are within the fourth PRB 1008, and antenna ports 36-47 are within the third PRB 1006. Thus, sets (or subsets) 0-11, 12-23, 24-35, and 36-47 are in a disjoint arrangement. In other words, no DM-RS appearing in one PRB appears in another PRB.

Figure 11:
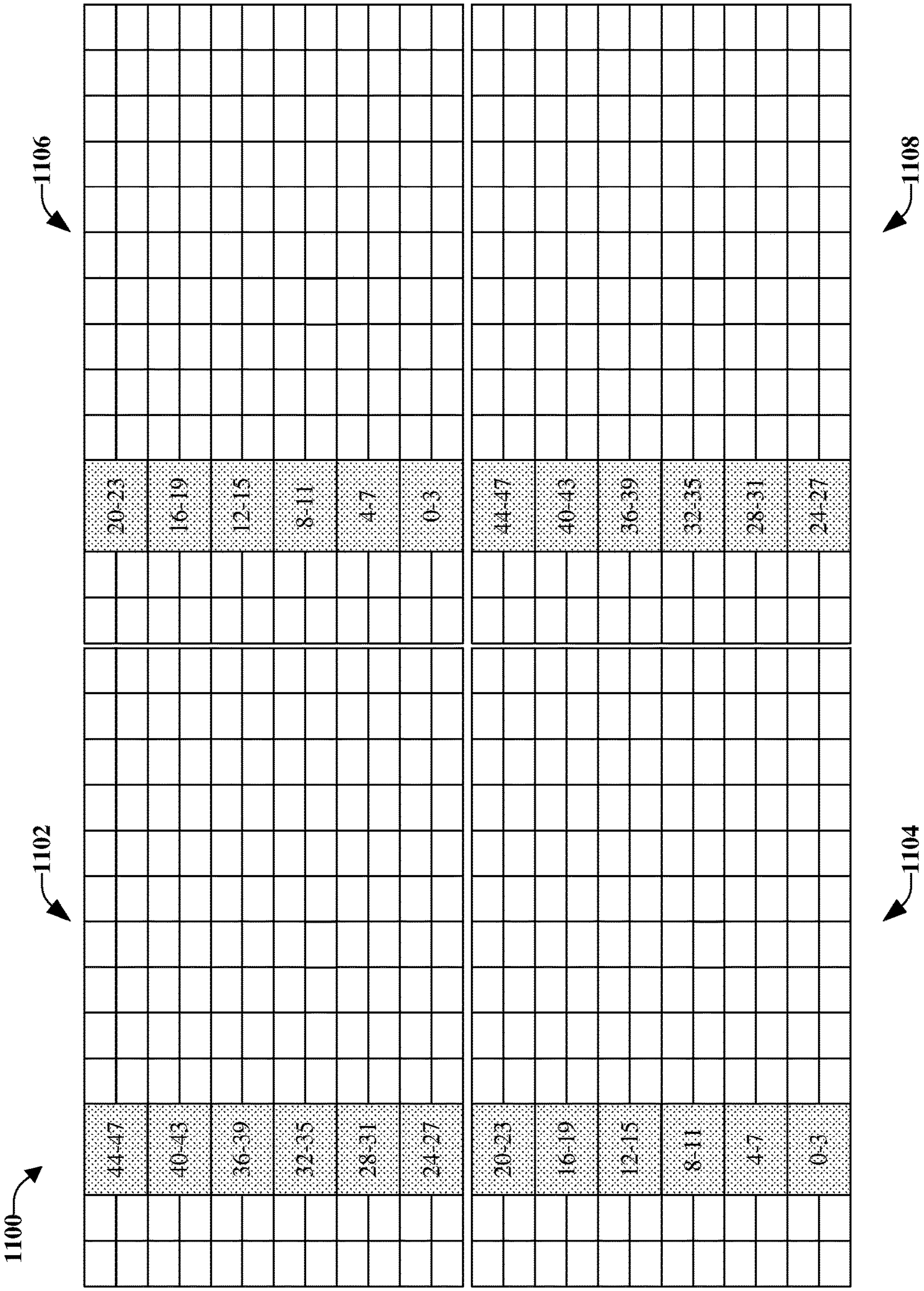
FIG. 11 illustrates an example, non-limiting, schematic representation of a DM-RS configuration with non-disjoint DM-RS subsets in accordance with one or more embodiments described herein.

FIG. 11 illustrates an example, non-limiting, schematic representation of a DM-RS configuration 1100 with non-disjoint DM-RS subsets in accordance with one or more embodiments described herein. As illustrated, there are four PRBs, namely, a first PRB 1102, a second PRB 1104, a third PRB 1106, and a fourth PRB 1108. This example considers the NR 12-port DM-RS depicted in FIG. 2 and expands it across 4 PRBs in both time and frequency dimensions.

The example of FIG. 11 includes 48 antenna ports (labeled 0-47) through DM-RS expansion across multiple PRBs suitable for MU-MIMO. The DM-RS expansion is over both the time dimension and the frequency dimension. In this use case, antenna ports 0-11 and 12-23 appear in both the second PRB 1104 and the third PRB 1006. Further, antenna ports 24-35 and 36-47 appear in both the first PRB 1102 and the fourth PRB 1108. Accordingly, the sets (or subsets) 0-11, 12-23, 24-35, and 36-47 are non-disjoint (e.g., appear in more than one PRB). A benefit of non-disjoint DM-RS subsets is that the subsets are more evenly distributed antenna ports across the 4 PRBs as compared to disjoint DM-RS subset of FIG. 10.

Figure 12:
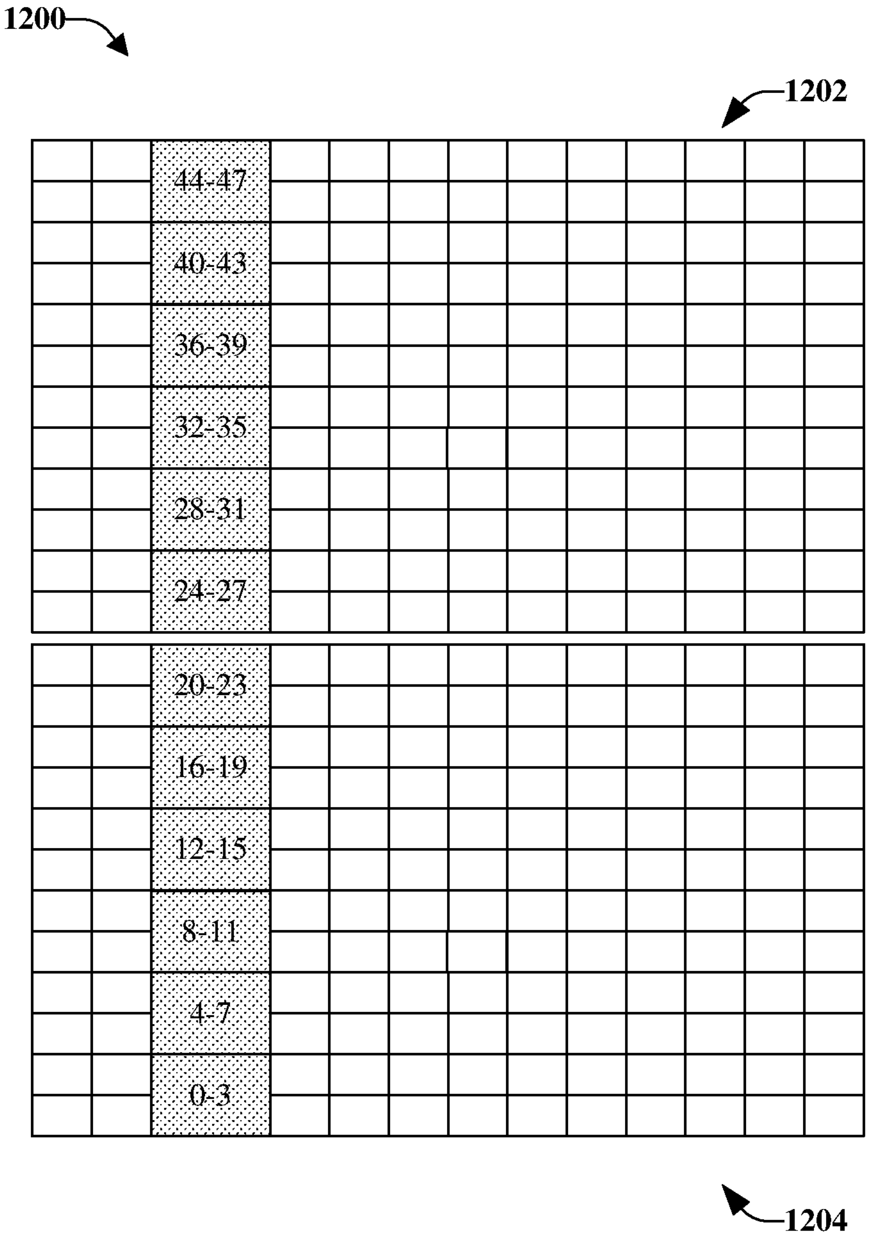
FIG. 12 illustrates an example, non-limiting, schematic representation of a DM-RS configuration with expansion over a frequency dimension in accordance with one or more embodiments described herein.

FIG. 12 illustrates an example, non-limiting, schematic representation of a DM-RS configuration 1200 with expansion over a frequency dimension in accordance with one or more embodiments described herein. Illustrated are two PRBs, namely, a first PRB 1202 and a second PRB 1204.

The example of FIG. 12 is for 48-port DM-RS with expansion across two consecutive PRBs in the frequency dimension. DM-RS subsets 0-23 are included in the second PRB 1204 and DM-RS subsets are included in the first PRB 1202. In this example, the DM-RS subset within one PRB does not follow NR design (within a PRB) as in the previous example since 24 antenna ports are packed into one PRB. Since the 48 DM-RS antenna ports are distributed across two PRBs, the density is one-half (0.50). If this density is too low, or based on other considerations, a tri-symbol configuration or a quad-symbol configuration can be implemented as discussed herein. If a tri-symbol configuration is used, the density is three-quarters (0.75). If a quad-symbol configuration is used, the density is one.

Figure 13:
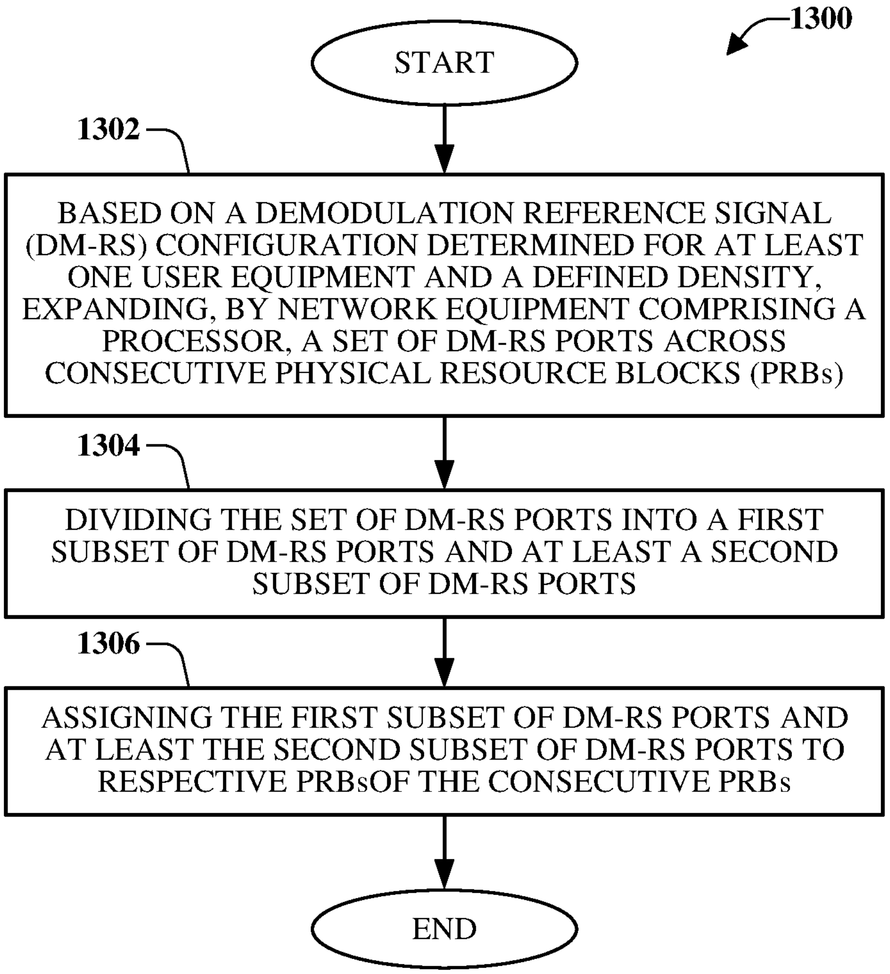
FIG. 13 illustrates a flow diagram of an example, non-limiting, computer-implemented method that facilitates a low-density DM-RS configuration in accordance with one or more embodiments described herein.

FIG. 13 illustrates a flow diagram of an example, non-limiting, computer-implemented method 1300 that facilitates a low-density demodulation reference signal configuration in accordance with one or more embodiments described herein. The computer-implemented method 1300 and/or other methods discussed herein can be implemented by network equipment comprising a processor. According to another example, the computer-implemented method can be implemented by a system comprising a processor and a memory.

Based on a demodulation reference signal (DM-RS) configuration determined for at least one user equipment and a defined density, the computer-implemented method 1300 starts at 1302, with, expanding a set of DM-RS ports across consecutive physical resource blocks (PRBs). Expanding the set of DM-RS ports can include, at 1304, dividing the set of DM-RS ports into a first subset of DM-RS ports and at least a second subset of DM-RS ports. Further, at 1306, the computer-implemented method 1300 includes assigning the first subset of DM-RS ports and at least the second subset of DM-RS ports to respective PRBs of the consecutive PRBs. According to some implementations, expanding the set of DM-RS ports can be determined based on employing AI processes and/or ML processes.

According to an implementation, the consecutive PRBs can be consecutive in a frequency dimension. Further to this implementation, expanding the set of DM-RS ports can include distributing the first subset of DM-RS ports and the second subset of DM-RS ports across the consecutive PRBs in the frequency dimension.

In another implementation, the consecutive PRBs are consecutive in a time dimension. Further to this implementation, expanding the set of DM-RS ports can include distributing the first subset of DM-RS ports and the second subset of DM-RS ports across the consecutive PRBs in the time dimension.

According to some implementations, the consecutive PRBs comprise a first PRB, a second PRB, a third PRB, and at least a fourth PRB. A first group comprising the first PRB and the second PRB and a second group comprising the third PRB and the fourth PRB are consecutive in a frequency dimension. Further, a third group comprising the first PRB and the third PRB and a fourth group comprising the second PRB and the fourth PRB are consecutive in a time dimension. Further to these implementations, expanding the set of DM-RS ports can include distributing the first subset of DM-RS ports and the second subset of DM-RS ports across the consecutive PRBs in both the frequency dimension and the time dimension.

Expanding the set of DM-RS ports at 1302 can include distributing the first subset of DM-RS ports and the second subset of DM-RS ports across the consecutive PRBs in a disjoint arrangement. In such a manner, DM-RS sets appear in only one PRB. Alternatively, Expanding the set of DM-RS ports at 1302 can include distributing the first subset of DM-RS ports and the second subset of DM-RS ports across the consecutive PRBs in a non-disjoint arrangement. According to the non-disjoint arrangement, DM-RS sets can appear in multiple PRBs.

Figure 14:
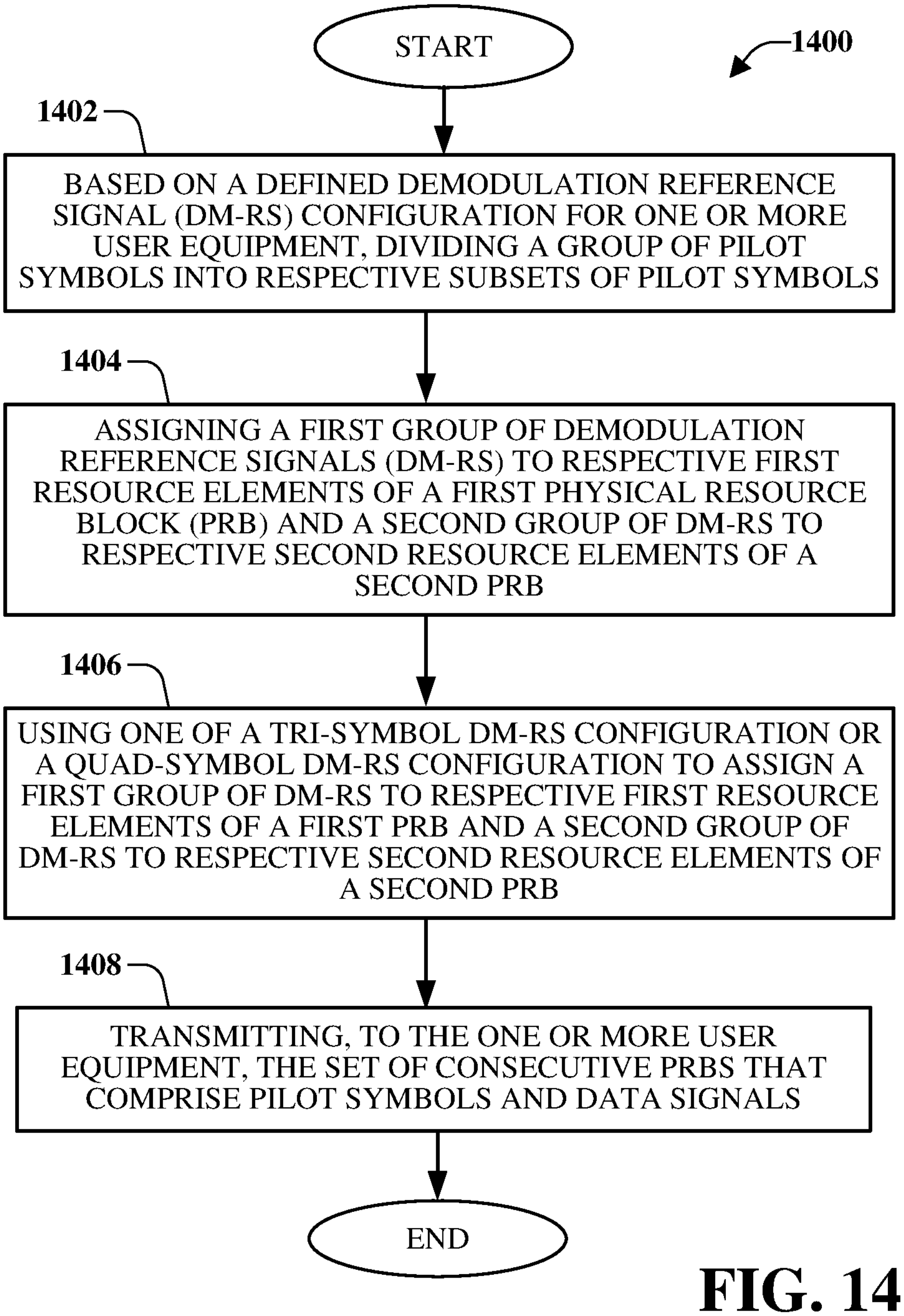
FIG. 14 illustrates a flow diagram of an example, non-limiting, computer-implemented method that facilitates a low-density DM-RS configuration while maintaining a defined density level in accordance with one or more embodiments described herein.

FIG. 14 illustrates a flow diagram of an example, non-limiting, computer-implemented method 1400 that facilitates a low-density demodulation reference signal configuration while maintaining a defined density level in accordance with one or more embodiments described herein. The computer-implemented method 1400 and/or other methods discussed herein can be implemented by network equipment comprising a processor. According to another example, the computer-implemented method can be implemented by a system comprising a processor and a memory.

At 1402, based on a defined demodulation reference signal (DM-RS) configuration for one or more user equipment, a group of pilot symbols is divided into respective subsets of pilot symbols. At 1404, a first group of DM-RS can be assigned to respective first resource elements of a first PRB and a second group of DM-RS are assigned to respective second resource elements of a second PRB. The first PRB and at least the second PRB are contiguous PRBs. It is noted that the DM-RS configuration can be for one UE or multiple UEs. In the latter case, each UE is assigned only a subset of all DM-RS ports. For example, it is possible that 32 DM-RS ports are assigned to 32 UEs (one port for each UE). However, the disclosed embodiments are not limited to this implementation.

According to an alternative implementation, at 1406, one of a tri-symbol DM-RS configuration or a quad-symbol DM-RS configuration can be used to assign a first group of DM-RS to respective first resource elements of a first PRB and a second group of DM-RS to respective second resource elements of a second PRB. Upon or after the assigning, the computer-implemented method 1400 continues, at 1408, with transmitting, to the one or more user equipment, the set of consecutive PRBs that comprise pilot symbols and data symbols.

Figure 15:
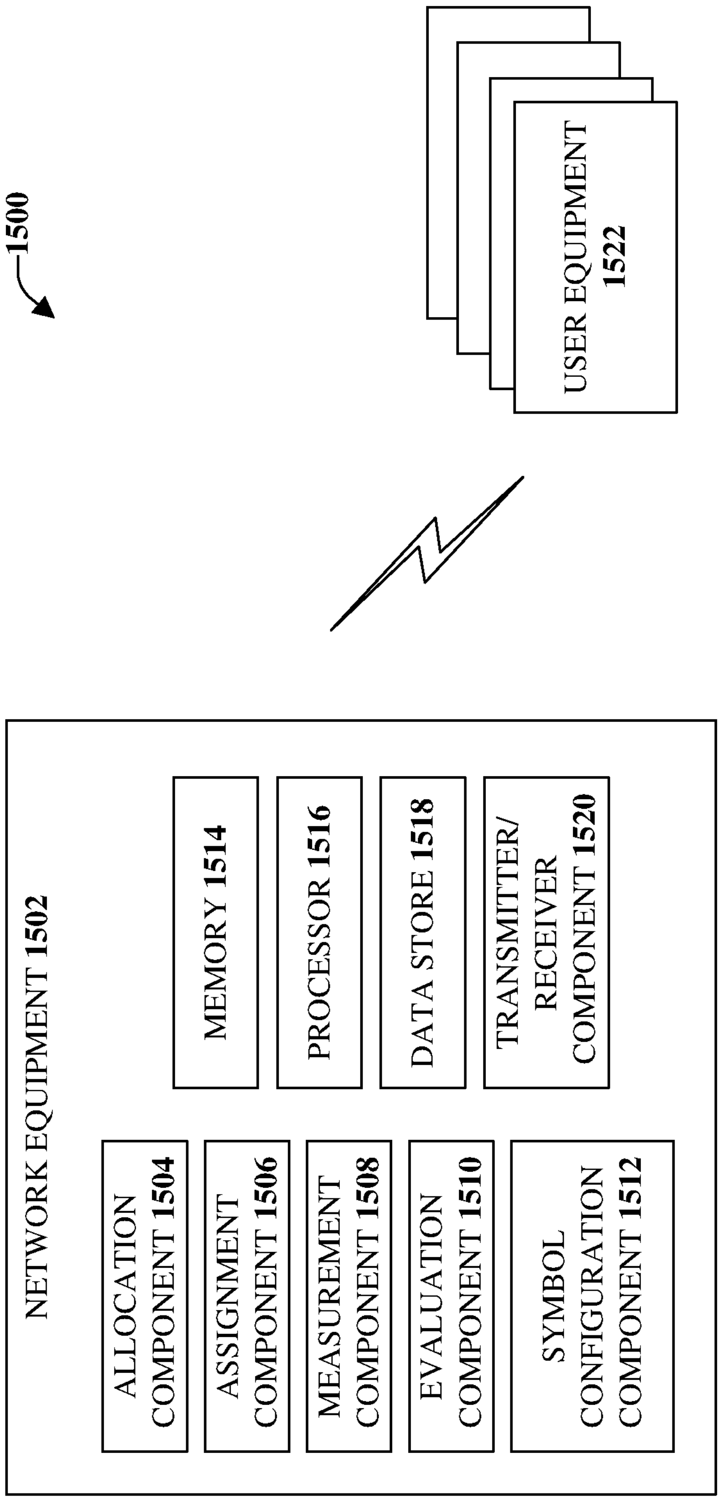
FIG. 15 illustrates an example, non-limiting, system that facilitates low-density DM-RS configuration in accordance with one or more embodiments described herein.

FIG. 15 illustrates an example, non-limiting, system 1500 that facilitates low-density DM-RS configuration in accordance with one or more embodiments described herein. Repetitive description of like elements employed in other embodiments described herein is omitted for sake of brevity. The system 1500 can be configured to perform functions associated with the computer-implemented method 1300 of FIG. 13, the computer-implemented method 1400 of FIG. 14, other computer-implemented methods, and/or the DM-RS configurations discussed herein.

Aspects of systems (e.g., the system 1500 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 1500 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 1500 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 1500 can include network equipment 1502 that includes an allocation component 1504, an assignment component 1506, a measurement component 1508, an evaluation component 1510, a symbol configuration component 1512, at least one memory 1514, at least one processor 1516, at least one data store 1518 (or at least one storage device), and a transmitter/receiver component 1520. The at least one memory 1514 can store computer executable components and instructions. The at least one processor 1516 can facilitate execution of the instructions (e.g., computer executable components and corresponding instructions) by the allocation component 1504, the assignment component 1506, the measurement component 1508, the evaluation component 1510, the symbol configuration component 1512, the transmitter/receiver component 1520, and/or other system components. As depicted, in some embodiments, one or more of the allocation component 1504, the assignment component 1506, the measurement component 1508, the evaluation component 1510, the symbol configuration component 1512, the at least one memory 1514, the at least one processor 1516, the at least one data store 1518, and the transmitter/receiver component 1520 can be electrically, communicatively, and/or operatively coupled to one another to perform one or more functions of the system 1500.

A DM-RS configuration for one or more user equipment 1522 can be determined (e.g., via a configuration component, not shown). The determination can be based on the number of DM-RS antenna ports, the UE CSI, and/or other UE-related information (e.g., UE position, UE speed, etc.) available at the network equipment 1502. Such information can be obtained through sensing (e.g., via the transmitter/receiver component 1520 and/or one or more sensor components, not shown) or another approach. CSI is available at the network equipment either through UE feedback (e.g., received via the transmitter/receiver component 1520) or uplink-downlink channel reciprocity in Time Division Multiplexing (TDD) mode (e.g., via the transmitter/receiver component 1520).

The allocation component 1504 can be configured to, based on a defined demodulation reference signal (DM-RS) configuration for the one or more user equipment 1522, divide a group of pilot symbols into respective subsets of pilot symbols. The assignment component 1506 can be configured to assign the respective subsets of pilot symbols to respective physical resource blocks (PRBs) of a set of consecutive PRBs. The assignment component 1506 can use collected UE CSI samples to analyze UE channel rank and/or sparsity, which can be used for the determination of DM-RS density across the frequency domain. On the other hand, the assignment component 1506 can use UE speed as a factor to determine DM-RS density across the time domain. The higher the UE speed and/or UE doppler spread, the more DM-RS are implicated to be used for sufficient channel estimation accuracy.

The transmitter/receiver component 1520 can transmit the set of consecutive PRBs that comprise pilot symbols and data symbols to the one or more user equipment 1522. It is noted that although discussed with respect to a single UE, the disclosed embodiments can be utilized with multiple UEs within a communications network.

In an example, the set of consecutive PRBs can be consecutive in a time dimension, a frequency dimension, or a combination thereof (e.g., both a time dimension and a frequency dimension, which can also be referred to as a time domain and a frequency domain).

To assign the respective subset of pilot symbols, the assignment component 1506 can distribute the pilot symbols among the consecutive PRBs in a disjoint arrangement of pilot symbols. Alternatively, or additionally, the assignment component 1506 can distribute the pilot symbols among the consecutive PRBs in a non-disjoint arrangement of pilot symbols.

According to some implementations, the measurement component 1508 can measure or determine a density of pilot symbols, after the dividing. The evaluation component 1510 can determine whether the measured density satisfies a defined density level or fails to satisfy the defined density level. If the evaluation component 1510 determines the measured density fails to satisfy the defined density level, the symbol configuration component 1512 can use a tri-symbol configuration and/or a quad-symbol configuration for the respective subsets of pilot symbols within the respective PRBs.

The at least one memory 1514 can be operatively connected to the at least one processor 1516. The at least one memory 1514 can store executable instructions and/or computer executable components (e.g., the allocation component 1504, the assignment component 1506, the measurement component 1508, the evaluation component 1510, the symbol configuration component 1512, the transmitter/receiver component 1520, and so on) that, when executed by the at least one processor 1516 can facilitate performance of operations (e.g., the operations discussed with respect to the various use cases, DM-RS configurations, methods, and/or systems discussed herein). Further, the at least one processor 1516 can be utilized to execute the computer executable components stored in the at least one memory 1514.

For example, the at least one memory 1514 can store protocols associated with facilitating low-density demodulation reference signal configuration as discussed herein. Further, the at least one memory 1514 can facilitate action to control communication between the network equipment 1502, other network equipment, the one or more user equipment 1522, and/or other user equipment, such that the system 1500 employs stored protocols and/or algorithms to achieve improved overall performance based on DM-RS expansion as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 1516 can facilitate respective analysis of information related to facilitating low-density DM-RS configuration and DM-RS expansion. The at least one processor 1516 can be a processor dedicated to analyzing and/or generating information received, a processor that controls one or more components of the system 1500, and/or a processor that both analyzes and generates information received and controls one or more components of the system 1500.

The transmitter/receiver component 1520 can receive information and/or can return information indicative of DM-RS assignment and/or transmission of pilot symbols and data. The transmitter/receiver component 1520 can be configured to transmit to, and/or receive data from, for example, one or more network equipment, and/or one or more user equipment. Through the transmitter/receiver component 1520, the system 1500 can concurrently transmit and receive data, can transmit and receive data at different times, or combinations thereof.

Figure 16:
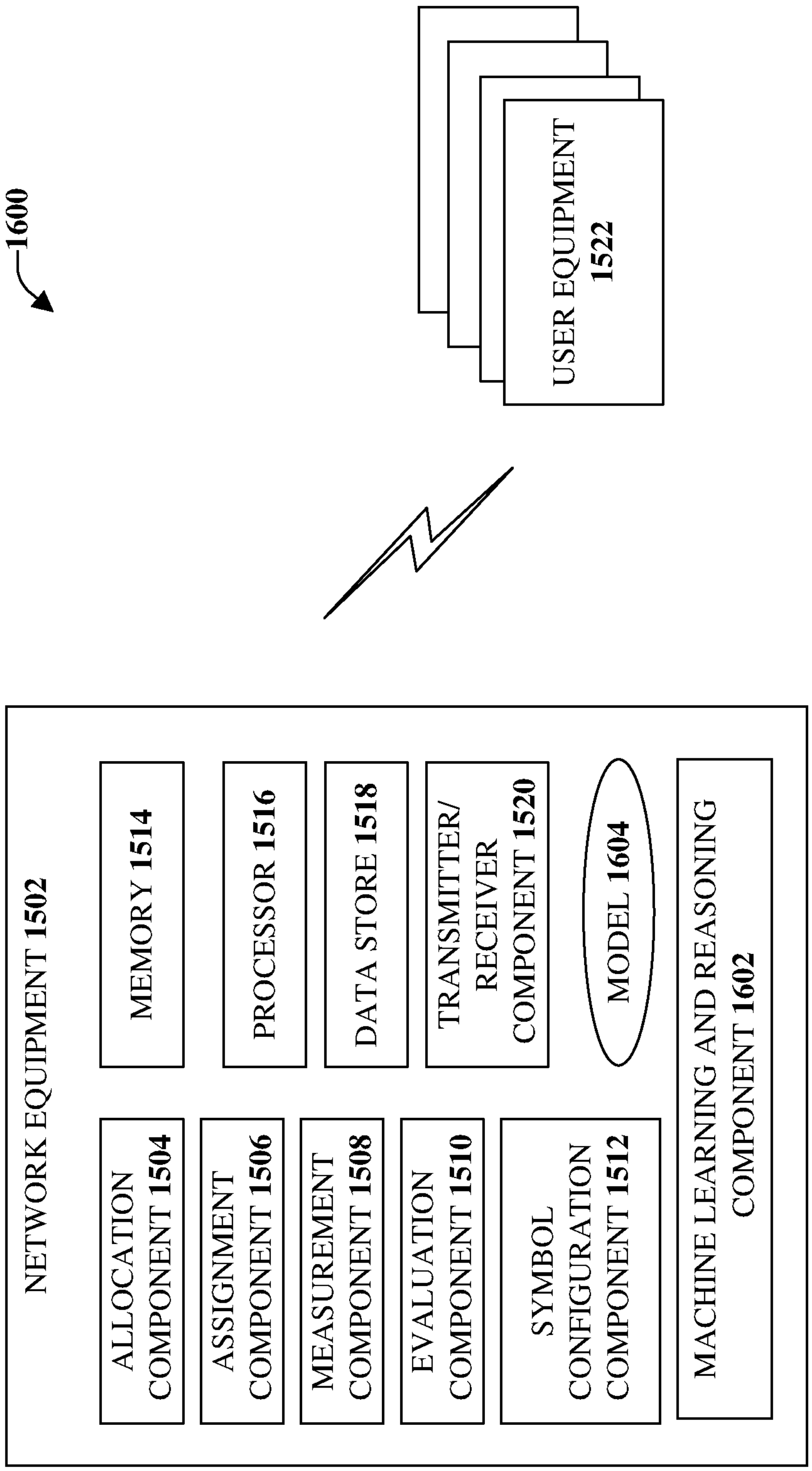
FIG. 16 illustrates an example, non-limiting, system that employs automated learning that trains a model to facilitate one or more of the disclosed aspects in accordance with one or more embodiments described herein.

FIG. 16 illustrates an example, non-limiting, system 1600 that employs automated learning that trains a model to facilitate one or more of the disclosed aspects in accordance with one or more embodiments described herein. Repetitive description of like elements employed in other embodiments described herein is omitted for sake of brevity. The system 1600 can comprise one or more of the components and/or functionality of the system 1500 of FIG. 15, and vice versa.

As illustrated, the network equipment 1502 can comprise a machine learning and reasoning component 1602 that can be utilized to automate one or more of the disclosed aspects based on training a model 1604. The machine learning and reasoning component 1602 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1602 can employ principles of probabilistic and decision theoretic inference. Additionally, or alternatively, the machine learning and reasoning component 1602 can rely on predictive models (e.g., the model 1604) constructed using machine learning and/or automated learning procedures. Logic-centric inference can also be employed separately or in conjunction with probabilistic methods.

The machine learning and reasoning component 1602 can infer the amount of DM-RS expansion to be utilized (e.g., the number of consecutive PRBs, whether the expansion should be in a time dimension, a frequency dimension, or a combination thereof, and so on) by obtaining knowledge about the possible actions and knowledge about the desired density level, a trade-off between better channel estimation (higher density) and the opportunity to transmit more data (lower density), and so on. Based on this knowledge, the machine learning and reasoning component 1602 can make an inference based on the type of DM-RS expansion (e.g., across time, frequency, or both time and frequency), whether to use tri-symbol expansion, quad-symbol expansion, or combinations thereof.

As used herein, the term "inference" refers generally to the process of reasoning about or inferring states of a system, a component, a module, an environment, and/or devices from a set of observations as captured through events, reports, data, and/or through other forms of communication. Inference can be employed to identify a manner of DM-RS expansion across multiple consecutive PRBs, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating low-density demodulation reference signal configuration) can employ various artificial intelligence-based schemes for carrying out various aspects thereof. For example, a process for determining if a particular configuration for DM-RS expansion should be utilized) can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine a type of DM-RS expansion to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by obtaining current information, by obtaining historical information, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, the number of consecutive PRBs to utilize for DM-RS expansion, one or more dimensions on which to implement DM-RS expansion, whether to use a tri-symbol configuration and/or a quad-symbol configuration, and so forth.

Additionally, or alternatively, an implementation scheme (e.g., a rule, a policy, and so on) can be applied to control and/or regulate DM-RS expansion as discussed herein. In some implementations, based upon a predefined criterion, the rules-based implementation can automatically and/or dynamically apply DM-RS expansion. In response thereto, the rule-based implementation can automatically interpret and carry out functions associated DM-RS expansion by employing a predefined and/or programmed rule(s) based upon any desired criteria.

According to some implementations, seed data (e.g., a data set) can be utilized as initial input to the model 1604 to facilitate the training of the model 1604. In an example, if seed data is utilized, the seed data can be obtained from one or more historical data associated with channel state information and/or other information indicative of a density of pilot signals. However, the disclosed embodiments are not limited to this implementation and seed data is not necessary to facilitate training of the model 1604. Instead, the model 1604 can be trained on new data received (e.g., via a feedback loop).

The data (e.g., seed data and/or new data, including feedback data) can be collected and, optionally, labeled with various metadata. For example, the data can be labeled with an indication of the communication protocol being utilized for communication, or other data, such as identification of respective equipment that provided one or more signals, a time the one or more signals were received, the content of the one or more signals, and so on.

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (ISCSI), Fibre Channel (FC), and/or wireless protocols. The clients can include user applications, application servers, data management tools, and/or testing systems.

As utilized herein an "entity." "client." "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 17:
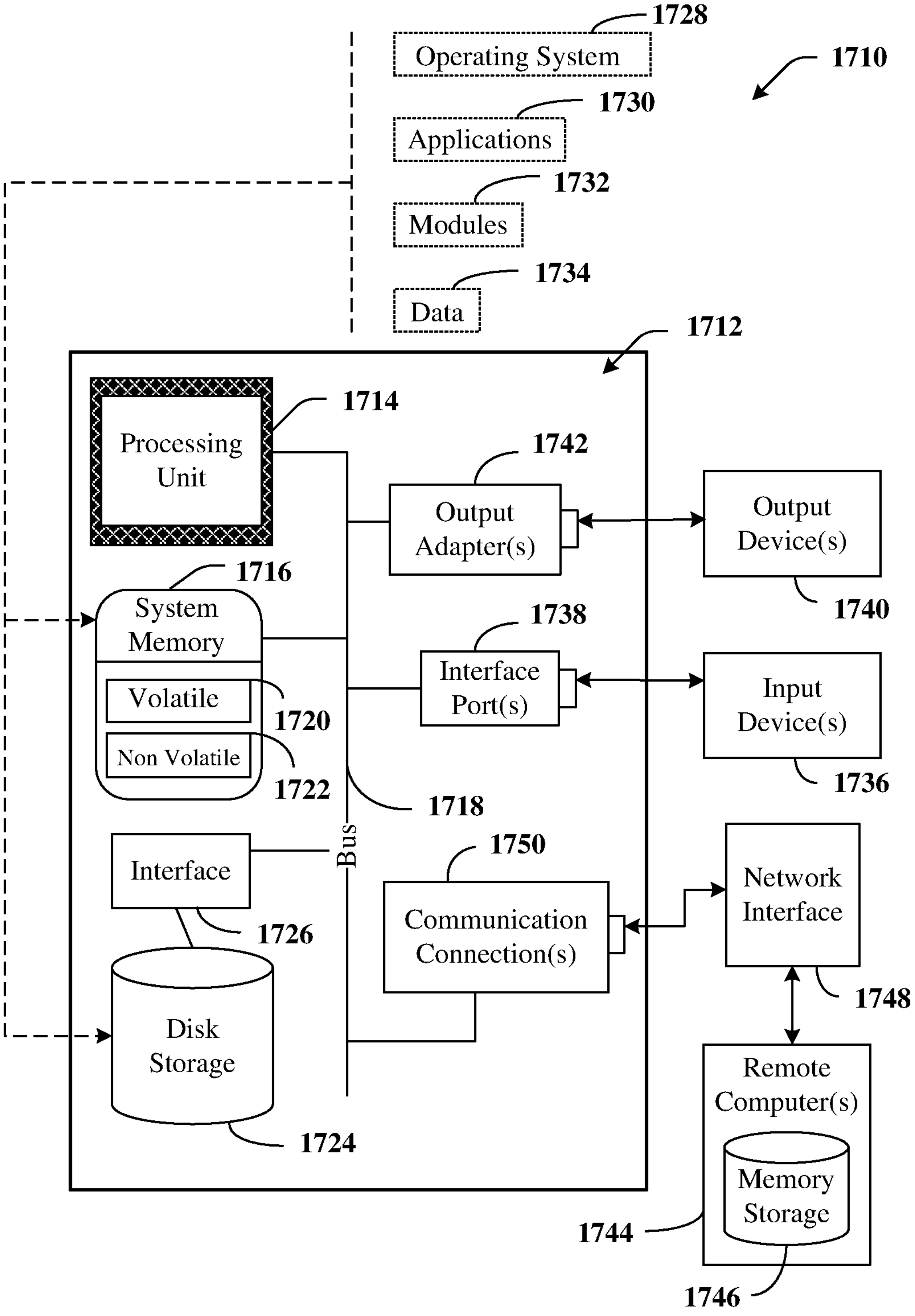
FIG. 17 illustrates an example, non-limiting, computing environment in which one or more embodiments described herein can be facilitated.

In order to provide a context for the various aspects of the disclosed subject matter, FIG. 17 as well as the following discussion are intended to provide a brief, general description of a suitable environment in which the various aspects of the disclosed subject matter can be implemented.

With reference to FIG. 17, an example environment 1710 for implementing various aspects of the aforementioned subject matter comprises a computer 1712. The computer 1712 comprises a processing unit 1714, a system memory 1716, and a system bus 1718. The system bus 1718 couples system components including, but not limited to, the system memory 1716 to the processing unit 1714. The processing unit 1714 can be any of various available processors. Multicore microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 comprises volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can comprise read only memory (ROM), programmable ROM (PROM), electrically programmable ROM (EPROM), electrically erasable PROM (EEPROM), or flash memory. Volatile memory 1720 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also comprises removable/non-removable, volatile/non-volatile computer storage media. FIG. 17 illustrates, for example a disk storage 1724. Disk storage 1724 comprises, but is not limited to, devices like a magnetic disk drive, floppy disk drive, tape drive, Jaz drive, Zip drive, LS-100 drive, flash memory card, or memory stick. In addition, disk storage 1724 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software comprises an operating system 1728. Operating system 1728, which can be stored on disk storage 1724, acts to control and allocate resources of the computer 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 comprise, for example, a serial port, a parallel port, a game port, and a universal serial bus (USB). Output device(s) 1740 can use some of the same type of ports as input device(s) 1736. Thus, for example, a USB port can be used to provide input to computer 1712, and to output information from computer 1712 to an output device 1740. Output adapters 1742 are provided to illustrate that there are some output devices 1740 like monitors, speakers, and printers, among other output devices 1740, which require special adapters. The output adapters 1742 comprise, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically comprises many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the system bus 1718. While communication connection 1750 is shown for illustrative clarity inside computer 1712, it can also be external to computer 1712. The hardware/software necessary for connection to the network interface 1748 comprises, for exemplary purposes only, internal and external technologies such as, modems including regular telephone grade modems, cable modems and DSL modems, ISDN adapters, and Ethernet cards.

Figure 18:
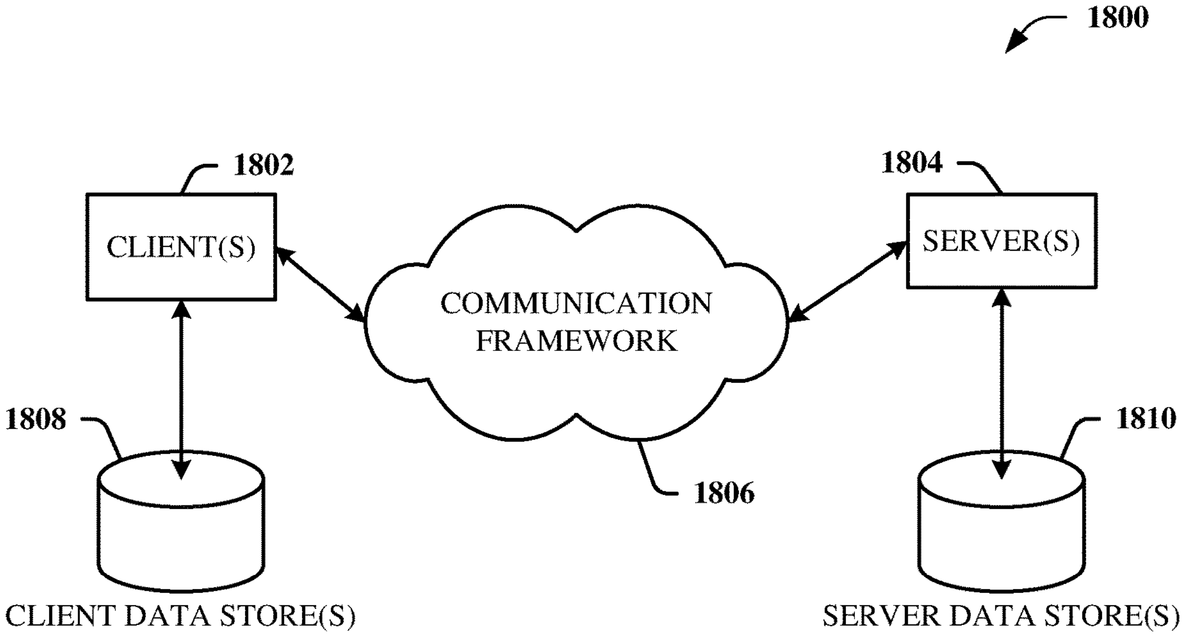
FIG. 18 illustrates an example, non-limiting, networking environment in which one or more embodiments described herein can be facilitated.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, when the term "set" is used (e.g., "a set of carriers," "a set of cells," and so on), it means a non-zero set, "at least one", or "one or more." In a similar manner, when the term subset is used, it means a non-zero set, "at least one," or "one or more."

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

based on a demodulation reference signal (DM-RS) configuration determined for at least one user equipment and a defined DM-RS density level, expanding, by network equipment comprising at least one processor, a full set of DM-RS ports across consecutive physical resource blocks (PRBs), wherein the defined DM-RS density level is a number of resource elements occupied by DM-RS in a single PRB, and wherein the expanding comprises:

dividing the full set of DM-RS ports into a first subset of DM-RS ports and at least a second subset of DM-RS ports, and assigning the first subset of DM-RS ports to a first PRB of the consecutive PRBs, and, assigning the at least the second subset of DM-RS ports to at least a second PRB of the consecutive PRBs.

2. The method of claim 1, wherein the consecutive PRBs are consecutive in a frequency dimension, and wherein the expanding comprises distributing the first subset of DM-RS ports and the second subset of DM-RS ports across the consecutive PRBs in the frequency dimension.

3. The method of claim 1, wherein the consecutive PRBs are consecutive in a time dimension, and wherein the expanding comprises distributing the first subset of DM-RS ports and the second subset of DM-RS ports across the consecutive PRBs in the time dimension.

4. The method of claim 1, wherein the consecutive PRBs comprise the first PRB, at least the second PRB, a third PRB, and at least a fourth PRB, wherein a first group comprising the first PRB and at least the second PRB and a second group comprising the third PRB and the fourth PRB are consecutive in a frequency dimension, and wherein a third group comprising the first PRB and the third PRB and a fourth group comprising at least the second PRB and at least the fourth PRB are consecutive in a time dimension.

5. The method of claim 4, wherein the expanding comprises distributing the first subset of DM-RS ports and the second subset of DM-RS ports across the consecutive PRBs in the frequency dimension and the time dimension.

6. The method of claim 1, wherein the expanding comprises distributing the first subset of DM-RS ports and the second subset of DM-RS ports across the consecutive PRBs in a disjoint arrangement in which DM-RS sets appear in only one PRB.

7. The method of claim 1, wherein the expanding comprises distributing the first subset of DM-RS ports and the second subset of DM-RS ports across the consecutive PRBs in a non-disjoint arrangement in which DM-RS sets appear in multiple PRBs.

8. The method of claim 1, further comprising:

using, by the network equipment, three consecutive orthogonal frequency-division multiplexing (OFDM) symbols in respective PRBs of the consecutive PRBs.

9. The method of claim 1, further comprising:

using, by the network equipment, four consecutive orthogonal frequency-division multiplexing (OFDM) symbols in respective PRBs of the consecutive PRBs.

10. The method of claim 1, wherein the network equipment is configured to operate according to a new radio network communication protocol.

11. A system, comprising:

at least one memory that stores executable instructions; and at least one processor that executes the executable instructions to facilitate performance of operations, the operations comprising:

based on a defined demodulation reference signal (DM-RS) configuration for at least one user equipment and a defined DM-RS density level, dividing a group of pilot symbols into respective subsets of pilot symbols, wherein the defined DM-RS density level is a number of resource elements, in a single physical resource block (PRB), that are occupied by DM-RS;

assigning a first subset of pilot symbols of the respective subsets of pilot symbols to a first PRB of a set of consecutive PRBs;

assigning a second subset of pilot symbols of the respective subsets of pilot symbols to a second PRB of the set of consecutive PRBs; and transmitting, to the at least one user equipment, the set of consecutive PRBs that comprise pilot symbols and data symbols.

12. The system of claim 11, wherein the set of consecutive PRBs are consecutive in a time dimension, a frequency dimension, or a combination thereof.

13. The system of claim 11, wherein the assigning comprises distributing the pilot symbols among the consecutive PRBs in a disjoint arrangement of pilot symbols.

14. The system of claim 11, wherein the assigning comprises distributing the pilot symbols among the consecutive PRBs in a non-disjoint arrangement of pilot symbols.

15. The system of claim 11, wherein the operations further comprise:

using a tri-symbol configuration for the respective subsets of pilot symbols within the respective PRBs.

16. The system of claim 11, wherein the operations further comprise:

using a quad-symbol configuration for the respective subsets of pilot symbols within the respective PRBs.

17. The system of claim 11 is configured to operate within a communication network that employs extreme multiple input multiple output technology.

18. A non-transitory machine-readable medium comprising executable instructions that are executed by at least one processor of network equipment to facilitate performance of operations, the operations comprising:

based on a demodulation reference signal (DM-RS) configuration determined for at least one user equipment and a defined DM-RS density level, assigning a first group of demodulation reference signals (DM-RS) to respective first resource elements of a first physical resource block (PRB); and assigning a second group of DM-RS to respective second resource elements of a second PRB, wherein the first PRB and at least the second PRB are contiguous physical resource blocks, wherein the defined DM-RS density level is a number of resource elements occupied by DM-RS ports in a single PRB, and wherein one full set of DM-RS ports comprise the first group of DM-RS and the second group of DM-RS.

19. The non-transitory machine-readable medium of claim 18, wherein the first PRB and at least the second PRB are contiguous physical resource blocks in a time dimension, a frequency dimension, or both the time dimension and the frequency dimension.

20. The non-transitory machine-readable medium of claim 18, wherein the assigning of the first group of DM-RS and the assigning of the second group of DM-RS comprises using one of a tri-symbol DM-RS configuration or a quad-symbol DM-RS configuration.

* * * * *